United States Patent [19]

Kuroda et al.

[11] Patent Number: 5,379,634
[45] Date of Patent: Jan. 10, 1995

[54] MISFIRE-DETECTING SYSTEM FOR INTERNAL COMBUSTION ENGINES

[75] Inventors: Shigetaka Kuroda; Kazutomo Sawamura; Yuuichi Shimasaki; Masaki Kanehiro; Takuji Ishioka; Shigeru Maruyama; Yoichi Nishimura; Akira Katoh, all of Wako, Japan

[73] Assignee: Honda Giken Kogyo Kabushiki Kaisha, Tokyo, Japan

[21] Appl. No.: 912,405

[22] Filed: Jul. 13, 1992

[30] Foreign Application Priority Data

| Jul. 12, 1991 | [JP] | Japan | 3-062210[U] |
| Jul. 12, 1991 | [JP] | Japan | 3-197412 |
| Jul. 12, 1991 | [JP] | Japan | 3-197413 |
| Dec. 4, 1991 | [JP] | Japan | 3-347728 |
| Dec. 27, 1991 | [JP] | Japan | 3-360626 |
| Dec. 27, 1991 | [JP] | Japan | 3-360627 |

[51] Int. Cl.$^6$ .................................. G01L 15/00
[52] U.S. Cl. .................................. 73/116; 123/419
[58] Field of Search .................. 73/116, 117.3; 123/419

[56] References Cited

U.S. PATENT DOCUMENTS

| 5,095,742 | 3/1992 | James et al. | 73/116 |
| 5,200,899 | 4/1993 | Ribbens et al. | 123/419 X |
| 5,237,862 | 8/1993 | Mangrulkar et al. | 73/116 |
| 5,269,178 | 12/1993 | Vigmostad et al. | 73/116 |

FOREIGN PATENT DOCUMENTS

| 2-49955 | 2/1990 | Japan . |
| 2-112646 | 4/1990 | Japan . |

*Primary Examiner*—Hezron E. Williams
*Assistant Examiner*—James M. Olsen
*Attorney, Agent, or Firm*—Nikaido, Marmelstein, Murray & Oram

[57] ABSTRACT

A misfire-detecting system for an internal combustion engine having a plurality of cylinders. A rotational speed of the engine is detected and a rotational speed signal indicative of the detected rotational speed of the engine is output. The rotational speed signal is filtered. Occurrence of a misfire in the engine is determined based on the filtered rotational speed signal.

29 Claims, 26 Drawing Sheets

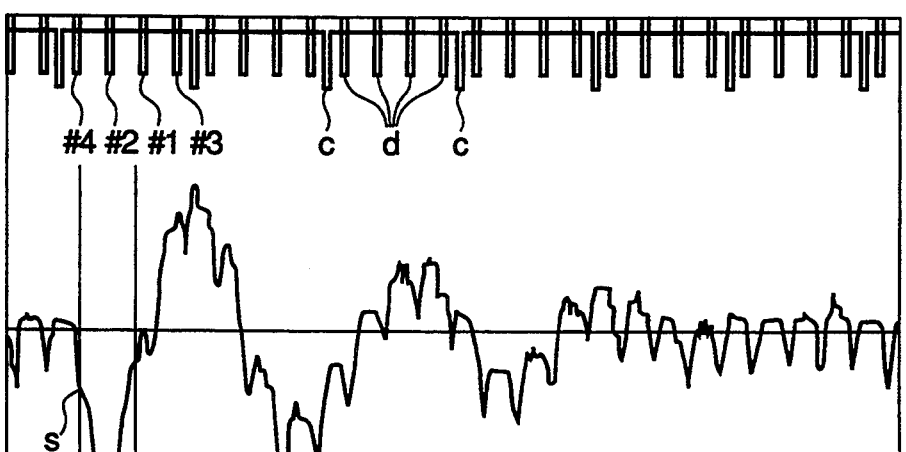
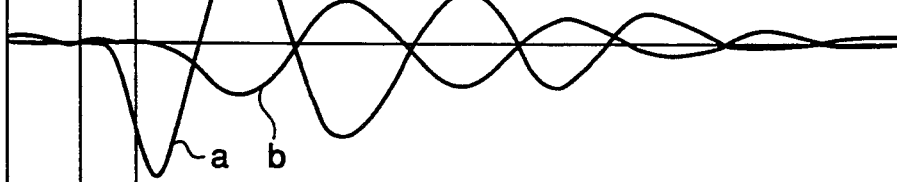
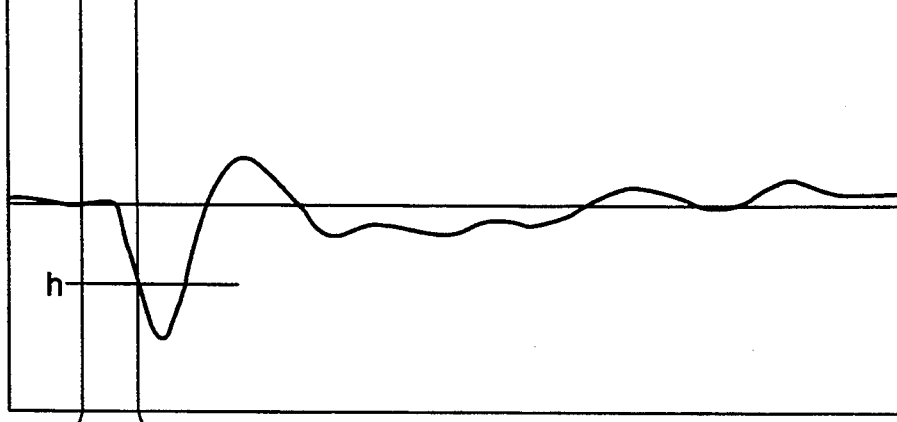
FIG.5A
FIG.5B
FIG.5C
FIG.5D
MISFIRE OCCURRED   MISFIRE DETECTED

MISFIRE-DETECTING SYSTEM FOR INTERNAL COMBUSTION ENGINES

BACKGROUND OF THE INVENTION

1. Field of the Invention

This invention relates to a misfire-detecting system for a multiple cylinder-type internal combustion engines which detects a misfire, i.e. an abnormal firing occurring in a cylinder when spark ignition is not properly effected in the cylinder, and more particularly to a misfire-detecting system which is adapted to detect a misfire based on variations or fluctuations in the rotational speed of the crankshaft of the engine.

2. Prior Art

Recently, in order to cope with the problem of environmental pollution, etc., there has been an increasing need for detecting a misfire occurring in an internal combustion engine, which causes emission of undesirably rich exhaust gases. Further, it is also required to determine which cylinder is suffering from a misfire, particularly in an internal combustion engine for automotive vehicles, which is of a multiple cylinder type.

A misfire-detecting system of this type has been disclosed in Japanese Provisional Patent Publication (Kokai) No. 2-112646, in which a misfire is detected based on variation in the rotational speed of the engine. More specifically, in this system, the rotational speed of the crankshaft is momentarily detected when a piston within each cylinder is in a particular position, e.g. in the vicinity of a top dead center position, and a misfire is detected based on variation in the rotational speed of the crankshaft thus detected.

Further, a misfire-detecting system for internal combustion engines has also been proposed e.g. by Japanese Provisional Patent Publication (Kokai) No. 2-49955, in which a signal is output whenever the crankshaft rotates through a predetermined angle, and variation in the time intervals between signals thus output (variation in the rotational speed of the crankshaft) is detected to thereby detect a cylinder in which a misfire is occurring, based on the variation in the rotational speed of the crankshaft.

In general, the rotational speed of the engine (i.e. the rotational speed of the crankshaft) has a periodically changing characteristic when momentarily monitored with a very short time span such that it assumes the lowest value when the piston is close to its top dead center position, and then higher values until the next piston becomes close to its top dead center position. More specifically, in a multiple cylinder-type engine, while a certain cylinder is in the compression stroke, its piston reaches its top dead center position, and then the cylinder enters the explosion stroke where a compressed air-fuel mixture within the cylinder is ignited, so that the rotation of the crankshaft increases because the crankshaft is accelerated by downward movement of the piston under the pressure of the explosion gas. Then, the rotational speed of the crankshaft progressively decreases due to resistance applied by load on the engine until the next cylinder is subjected to ignition, which again causes acceleration of the crankshaft. This process is repeatedly carried out. Therefore, the rotational speed of the engine has a periodically changing characteristic, as mentioned above.

However, when a misfire occurs in one of the cylinders, the acceleration of the rotation of the crankshaft is not effected by the cylinder, so that the rotational speed continues to decrease even after its piston passes the top dead center position.

The above-mentioned proposed misfire-detecting systems utilize this fact, by detecting a momentary rotational speed of the crankshaft when each cylinder is in the vicinity of its top dead center position to thereby monitor variation in the rotational speed of the crankshaft, and by determining that the cylinder is normal when the variation is small, whereas a misfire has occurred in the cylinder when the variation is large, i.e. the rotational speed of the crankshaft has largely decreased. Further, it is possible to determine the cylinder in which a misfire has occurred, by identifying the cylinder which just passed the top dead center position immediately before a large decrease in the rotational speed was detected.

However, in the proposed misfire-detecting systems, a signal indicative of the engine rotational speed at a particular position of each cylinder is directly used for misfire detection, which makes it impossible to determine whether a variation in the rotational speed has been caused by a misfire or by another factor.

More specifically, the signal indicative of the detected engine rotational speed reflects a variation in the rotational speed which occurs at a frequency twice as high as the rotational speed of the engine if the engine is a four-cylinder type, and at a frequency three times the rotational speed of the engine if the engine is a six-cylinder type. Further, an internal combustion engine installed on an automotive vehicle also undergoes variations in the rotational speed which are caused by changes in the condition in which the vehicle is operating, such as acceleration or deceleration of the vehicle and travelling on a rough road. Therefore, the signal indicative of the detected rotational speed contains variations in the rotational speed which are caused by various factors other than a misfire.

As a result, if the signal indicative of the engine rotational speed is directly used for misfire detection as in the proposed system, the signal can contain noise produced particularly when the engine is in a high rotational speed/low load condition or when the engine is in a relatively low rotational speed condition while the vehicle is travelling on a rough road, which makes it difficult to discriminate a variation in the rotational speed which is caused by a misfire, resulting in low accuracy of misfire detection and difficulty in determining the cylinder which is suffering from the misfire.

The present inventors have made intensive studies to solve these problems, and found that by sequentially detecting a momentary rotational speed of the engine to obtain a waveform signal, and causing the signal to pass through a filter to obtain a signal having a particular frequency component therefrom, this signal contains considerably reduced variations in the rotational speed of the engine caused by factors other than a misfire. By monitoring the signal having a particular frequency component, it is possible to clearly and distinctly determine a variation in the rotational speed caused by a misfire, which enables to improve the accuracy of misfire detection.

However, when the engine undergoes a misfire, the rotational speed of the engine, after having decreased as described above, rises again due to a phenomenon of so-called "reactionary motion" of the main body of the engine and then falls again, followed by repeating this rise and fall process or vibration. The frequency of the reactionary motion is smaller than the frequency of variation in the rotational speed caused by a misfire but fairly close to the latter. Therefore, it is difficult to eliminate the influence of the reactionary motion by merely causing the signal to pass a filter. To eliminate the influence of the reactionary motion, it is necessary to increase the filtering frequency of the filter for filtering off low frequency signal components. If the filtering frequency is thus increased, however, the signal indicative of a decrease in the rotational speed caused by a misfire per se diminishes, and moreover vibration caused by the reactionary motion is not made smaller relative to the degree of diminution of the signal, which results in the possibility that a decrease in the rotational speed caused by the reactionary motion is erroneously taken for one caused by a misfire.

The reactionary motion is liable to occur when the engine rotational speed is low, whereas when the engine rotational speed is high, the signal indicative of the crankshaft rotational speed used for detecting variation in the crankshaft rotational speed is liable to contain noise produced by torsional vibration of the crankshaft or vibration thereof due to so-called "shaky movement" of journals, which also makes it difficult to accurately detect a misfire.

SUMMARY OF THE INVENTION

It is a first object of the invention to provide a misfire-detecting system for an internal combustion engine which is capable of clearly determining a variation in the rotational speed of the crankshaft caused by a misfire to thereby enhance the accuracy of misfire-detection and enable to accurately discriminate a cylinder in which the misfire is occurring.

It is a second object of the invention to provide a misfire-detecting system for an internal combustion engine which is capable of effectively eliminating the influence of factors other than a misfire and "the reactionary motion" subsequently occurring after a misfire, on the detection of variation in the rotational speed of the engine.

It is a third object of the invention to provide a misfire-detecting system for an internal combustion engine which is capable of very accurately detecting a misfire, irrespective of operating conditions of the engine.

It is a fourth object of the invention to provide a misfire-detecting system for an internal combustion engine which is capable of accurately determining a cylinder in which a misfire is occurring, irrespective of the type of a transmission or the state of engagement of a clutch of a vehicle on which the engine is installed or the state of use of a filter device.

To attain the above objects, according to a first aspect of the invention, there is provided a misfire-detecting system for an internal combustion engine having a plurality of cylinders, comprising:
  engine rotational speed-detecting device for detecting a rotational speed of the engine and outputting a rotational speed signal indicative of the detected rotational speed of the engine;
  signal-processing device for filtering the rotational speed signal to take out a particular frequency component therefrom; and
  misfire-determining device for determining occurrence of a misfire in the engine by comparing an output from the signal-processing device with a predetermined reference value.

Preferably, the signal-processing device includes characteristic-changing device for changing a filtering characteristic of the signal-processing device according to the rotational speed of the engine.

Also preferably, the signal-processing device comprises at least one of a low-pass filter for allowing components of the rotational speed signal lower than a first setting frequency thereof to pass therethrough and a high-pass filter for allowing components of the rotational speed signal higher than a second setting frequency thereof to pass therethrough.

According to a second aspect of the invention, there is provided a misfire-detecting system for an internal combustion engine having a plurality of cylinders, comprising:
  engine rotational speed-detecting device for detecting a rotational speed of the engine and outputting a rotational speed signal indicative of the detected rotational speed of the engine;
  signal-processing device for filtering the rotational speed signal to take out a particular frequency component therefrom;
  differentiating device for differentiating an output from the signal-processing device; and
  misfire-detecting device for determining occurrence of a misfire in the engine by comparing an output from the differentiating device with a predetermined reference value.

According to a third aspect of the invention, there is provided a misfire-detecting system for an internal combustion engine having a plurality of cylinders, comprising:
  engine rotational speed-detecting device for detecting a rotational speed of the engine and outputting a rotational speed signal indicative of the detected rotational speed of the engine;
  first signal-processing device for taking out a first particular frequency component from the rotational speed signal and outputting a first signal;
  second signal-processing device for taking out a second particular frequency component from the rotational speed signal and outputting a second signal having a predetermined amount of difference in phase from the first signal;
  third signal-processing device for combining the first signal and the second signal to output a third signal; and
  misfire-determining device for determining occurrence of a misfire in the engine by comparing a value of the third signal from the third signal-processing device with a predetermined reference value.

Preferably, the first signal-processing device and the second device comprise low-pass filters for taking the first and second particular frequency components lower than respective first and second predetermined frequencies.

Also preferably, the engine has a transmission connected thereto, and the misfire-detecting system includes gear ratio-detecting device for detecting a gear ratio of the transmission, and frequency characteristic-changing device for changing a frequency characteristic of the second signal-processing device in response to an output from the gear ratio-detecting device.

According to a fourth aspect of the invention, there is provided a misfire-detecting system for an internal combustion engine having a plurality of cylinders, comprising:

engine rotational speed-detecting device for detecting a rotational speed of the engine and outputting a rotational speed signal indicative of the detected rotational speed of the engine;

first signal-processing device for taking out a particular frequency component from the rotational speed signal and outputting a first signal;

second signal-processing device for taking out a particular frequency component from the rotational speed signal and outputting a second signal;

phase-adjusting device for adjusting a phase of the second signal;

amplifying device for amplifying an output from the phase-adjusting device;

third signal-processing device for combining the first signal and an output from the amplifying device to output a third signal; and misfire-determining device for determining occurrence of a misfire in the engine by comparing a value of the third signal from the third signal-processing device with a predetermined reference value.

Preferably, the misfire-detecting system includes gain control device for changing a gain of the amplifier according to operating conditions of the engine.

According to a fifth aspect of the invention, there is provided a misfire-detecting system for an internal combustion engine having a plurality of cylinders and a crankshaft, comprising:

engine rotational speed-detecting device for detecting a rotational speed of the engine whenever the crankshaft rotates through a predetermined angle and outputting a rotational speed signal indicative of the detected rotational speed of the engine;

filter device for taking out a predetermined frequency component from the rotational speed signal and outputting a signal; and misfire-determining device for determining occurrence of a misfire in the engine by comparing a value of the signal from the filter device with a predetermined reference value.

According to a sixth aspect of the invention, there is provided a misfire-detecting system for an internal combustion engine having a plurality of cylinders and a crankshaft, comprising:

engine rotational speed-detecting device for detecting a rotational speed of the engine whenever the crankshaft rotates through a predetermined angle and outputting a rotational speed signal indicative of the detected rotational speed of the engine;

filter device for taking out a predetermined frequency component from the rotational speed signal and outputting a signal;

differentiating device for differentiating an output from the filter device and outputting an output; and misfire-determining device for determining occurrence of a misfire in the engine by comparing an output from the differentiating device with a predetermined reference value.

According to a seventh aspect of the invention, there is provided a misfire-detecting system for an internal combustion engine having a plurality of cylinders and a crankshaft, comprising:

engine rotational speed-detecting device for detecting a rotational speed of the engine whenever the crankshaft rotates through a predetermined angle and outputting a rotational speed signal indicative of the detected rotational speed of the engine;

filter device for taking out a predetermined frequency component from the rotational speed signal and outputting a signal;

differentiating device for differentiating an output from the filter device and outputting an output;

difference-calculating device for calculating a difference between a present value of the output from the differentiating device and an average value of immediately preceding values thereof;

misfire-determining device for determining occurrence of a misfire in the engine by comparing an output from the difference-calculating device with a predetermined reference value.

Preferably, in this aspect of the invention, the misfire-determining device determines that a misfire has occurred in the engine when the difference is larger than the predetermined reference value.

The above and other objects, features, and advantages of the invention will become more apparent from the ensuing detailed description taken in conjunction with the accompanying drawings.

BRIEF DESCRIPTION OF THE DRAWINGS

FIG. 5 is a timing chart showing waveforms of signals outputted from component parts of the misfire-detecting system of FIG. 4, which is useful in explaining a manner of detecting a misfire based on the signal waveforms;

DETAILED DESCRIPTION

The invention will now be described in detail with reference to the drawings showing embodiments thereof.

Figure 1:
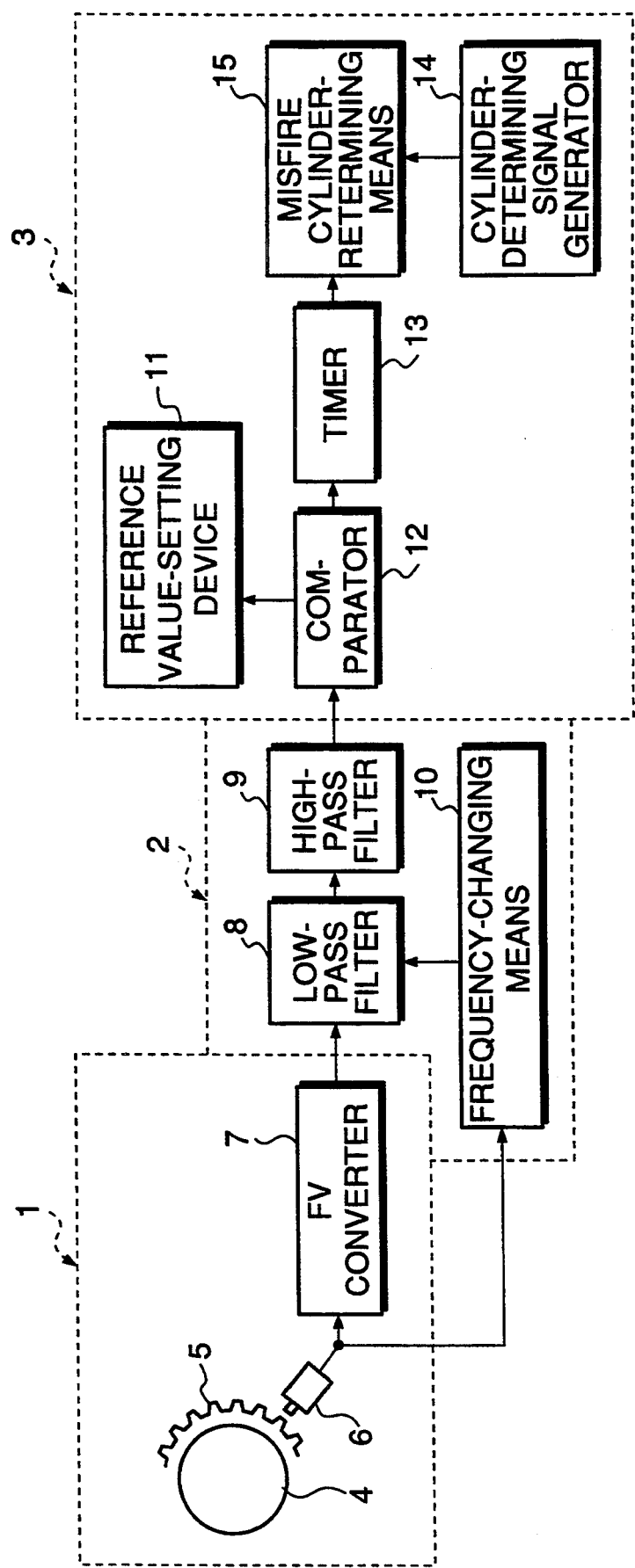
FIG. 1 is a block diagram schematically showing a misfire-detecting system for an internal combustion engine according to a first embodiment of the invention.

FIG. 1 schematically illustrates the arrangement of a misfire-detecting system for an internal combustion engine according to a first embodiment of the invention.

As shown in the figure, the misfire-detecting system comprises rotational speed-detecting means 1 for detecting the rotational speed of a crankshaft of a multiple cylinder-type internal combustion engine, signal-processing means 2 for processing a signal output from the rotational speed-detecting means, and misfire-determining means 3 for determining occurrence of a misfire based on an output signal supplied from the signal-processing means.

The rotational speed-detecting means is comprised of a rotary member adapted to rotate synchronously with the crankshaft, e.g. a ring gear mounted on a fly-wheel 4 disposed to rotate together with the crankshaft, a magnetic pickup 6 arranged in the vicinity of the ring gear 5, and an FV converter for converting an output signal from the pickup 6 to voltage.

The pickup 6 is formed of a magnet, and a coil wound on the magnet, and voltage is induced in the coil by a change in magnetic flux occurring whenever each of teeth on the ring gear 5 passes the pickup 6, so that the pickup outputs pulses accordingly. The width of each pulse indicates a momentary rotational speed of the crankshaft. The ring gear 5 has 120 teeth formed thereon along its whole circumference. Accordingly, the pickup 6 detects 120 momentary rotational speeds of the crankshaft per one rotation thereof.

Output signal pulses from the pickup 6 are converted to a signal having a voltage waveform. Thus, the rotational speed-detecting means 1 outputs a signal having a waveform indicative of variation in the rotational speed of the engine, which is formed of sequential pulses indicative of momentary rotational speeds thereof.

The signal-processing means 2 is formed by filter means comprised of a low-pass filter 8 for blocking or attenuating frequencies higher than a setting frequency, a high-pass filter 9 for blocking or attenuating frequencies lower than another setting frequency.

The low-pass filter 8 eliminates components of the voltage waveform signal corresponding to a variation in the rotational speed having a frequency twice as high as the frequency of rotation of the crankshaft, i.e. the engine rotational speed, in the case of a four cylinder-type engine, or a variation in the rotational speed having a frequency three times as high as the frequency of rotation of the crankshaft, i.e. the engine rotational speed in the case of a six cylinder-type engine. The setting frequency therefore has to be lower than the frequency twice or three times as high as the frequency of the engine rotational speed. To this end, the low-pass filter 8 is provided with frequency-changing means 10 for linearly or stepwise changing the setting frequency in accordance with the engine rotational speed.

The high-pass filter 9 eliminates components of the voltage waveform signal corresponding to variations in the rotational speed resulting from acceleration or deceleration of the vehicle or travelling thereof on a rough road. The setting frequency therefore has to be higher than the frequencies of such variations. However, to obtain distinct changes in the waveform which represent variation in the rotational speed due to a misfire, preferably the setting frequency is set e.g. to 3 Hz.

Thus, the signal-processing means 2 outputs a signal having only components of a particular frequency range between the setting frequency for the low-pass filter 8 and that for the high-pass filter 9.

The misfire-determining means 3 has a comparator 12 which compares an output from the signal-processing means with a reference value supplied from a reference value-setting device 11. When the output from the signal-processing means 2 is lower than the reference value, the comparator 12 outputs a signal having a predetermined level. The output signal from the comparator 12 is supplied to a timer 13, which outputs a misfire detection signal when the duration of the output signal from the comparator 12 is shorter than a predetermined time period.

The misfire detection signal is supplied to misfire cylinder-determining means 15, where it is processed with a cylinder-determining signal supplied from a cylinder-determining signal generator 14, to have corrected a time lag thereof caused by the low-pass filter 8 and the high-pass filter 9, to thereby determine a cylinder in which a misfire has occurred.

The operation of the misfire-detecting system constructed as above will now be described.

In the case that the engine is a four cylinder-type engine, the cylinder-determining signal generator 14 outputs the cylinder-determining signal which is formed of a combination of TDC signal pulses d, i.e. signals indicative of top dead center (TDC) positions of the cylinders and cylinder-discriminating signal pulses c. Ignition of the cylinders is performed in the order of #4, #2, #1, and #3.

Figures 2A, 2B, 2C:
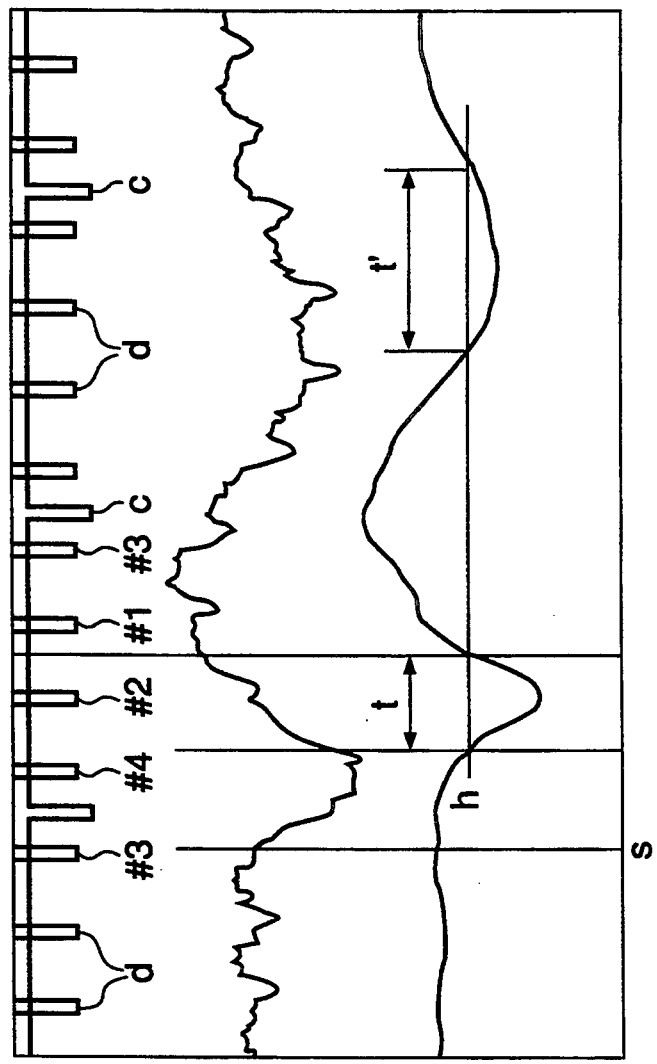
FIG. 2 is a timing chart showing waveforms of signals output from component parts of the misfire-detecting system of FIG. 1, which is useful in explaining a manner of detecting a misfire based on the signal waveforms.

The output signal from the FV converter 7 of the rotational speed-detecting means 1 has a waveform containing various frequency components as shown in FIG. 2(B). When the ignition of each cylinder is normally effected, the signal waveform has a relatively periodically changing characteristic as shown at a left end portion of the waveform as viewed in the figure.

Now, assuming that a misfire has occurred at a time point s, i.e. in the third cylinder #3, then the rotational speed of the crankshaft decreases to cause the signal waveform from the rotational speed-detecting means 1 to fall largely. The reactionary motion of the main body of the engine to the misfire causes the engine rotational speed to rise, and then it falls again. Thus, the signal waveform output from the rotational speed-detecting means 1 has a large undulation as shown at a center-to-rightward portion of FIG. 2(B) as viewed in the figure.

When the output signal from the rotational speed-detecting means 1 having a waveform as described above is supplied to the signal-processing means 2, the low-pass filter 8 eliminates high frequency components thereof, and the high-pass filter 9 eliminates low frequency components, to form a waveform distinctly showing a fall in the rotational speed caused by the misfire and an undulation resulting from the reactionary motion to the misfire, as shown in FIG. 2(C).

Then, the signal having this waveform is supplied from the signal-processing means 2 to the misfire-detecting means 3, where it is compared with the reference value generated by the reference value-setting device 11. The reference value has a level indicated by h in the figure. Therefore, the misfire causes the waveform to fall below the reference value.

Thus, by comparing the output value from the signal-processing means 2 with the reference value, it is determined that misfire has occurred.

As described heretofore, according to the present embodiment, by passing the output signal from the rotational speed-detecting means 1 through the signal-processing means 2 as the filter means comprised of the low-pass filter 8 and the high-pass filter 9, there are eliminated from the signal noise having a frequency having twice or three times as high as the frequency of rotation of the crankshaft of the engine, which noise will occur particularly when the engine is in a high rotational speed/low load condition, and noise having a low frequency resulting from a change in the operating condition of the automotive vehicle, which noise will occur particularly when the engine is operating at a relatively low rotational speed. In short, the misfire-detecting system of the present embodiment detects a misfire based on an engine rotational speed signal which has eliminated frequency components thereof representing variations in the rotational speed caused by factors other than the misfire. Therefore, it is possible to accurately detect a misfire and reliably determine a cylinder in which the misfire has occurred.

The frequency of variation in the rotational speed caused by the reactionary motion of the main body of the engine to a misfire is lower than the frequency of variation in the rotational speed caused by the misfire but fairly close to the latter. Therefore, it is difficult to completely eliminate the influence of the reactionary motion by merely causing the rotational speed signal to pass the signal-processing means 2. That is, to satisfactorily eliminate the influence of the reactionary motion, it is necessary to increase the setting frequency of the high-pass filter 9 which blocks or attenuates signal components lower than the setting frequency. If the setting frequency is thus increased, however, a signal component indicative of a decrease in the rotational speed caused by a misfire per se diminishes, whereas vibration caused by the reactionary motion is not made smaller relative to the degree of the signal component. As a result, the waveform signal still contains an undulation due to the reactionary motion even after passing through the signal-processing means.

Further, due to such an undulation of the waveform caused by the reactionary motion, the level of the signal from the signal-processing means 2 can fall below the level h of the reference value. This can lead to an erroneous detection that a misfire has occurred, though actually the decrease in the rotational speed has been caused by the reactionary motion.

To eliminate this inconvenience, the output signal from the comparator 12 is supplied to the timer 13, which in turn measures the duration of a state in which the level of the output signal from the signal-processing means 2 is lower than the reference value. As described above, the reactionary motion has a frequency lower than that of a misfire, which means that a component of the signal indicative of the reactionary motion has a longer duration. Therefore, if the time period over which the level of the output signal is lower than the reference value h due to a misfire is represented by t, and the time period over which the level of the output signal is lower than the reference value h due to the reactionary motion by $t'$, the relationship of $t < t'$ should hold, from which it is possible to discriminate a misfire from the reactionary motion.

Therefore, the timer 13 is adapted to output the misfire detection signal only when the duration of the the output signal from the comparator 12 which is indicative of the state in which the level of the output signal from the signal-processing means 2 is lower than the reference value is shorter than the predetermined time period, to thereby ensure a positive and accurate determination of occurrence of a misfire.

Then, the misfire detection signal from the timer 13 is supplied to the misfire cylinder-determining means 15, where a cylinder in which the misfire has occurred is identified. In this example, due to a time lag in the output signal from the signal-processing means 2, which is caused by the low-pass filter 8 and the high-pass filter 9, the misfire is detected when the second cylinder #2 is in the vicinity of the top dead center. Therefore, this time lag is corrected by the misfire cylinder-determining means 15 so that it is determined that the cylinder in which the misfire has occurred is the third cylinder #3.

Figure 3:
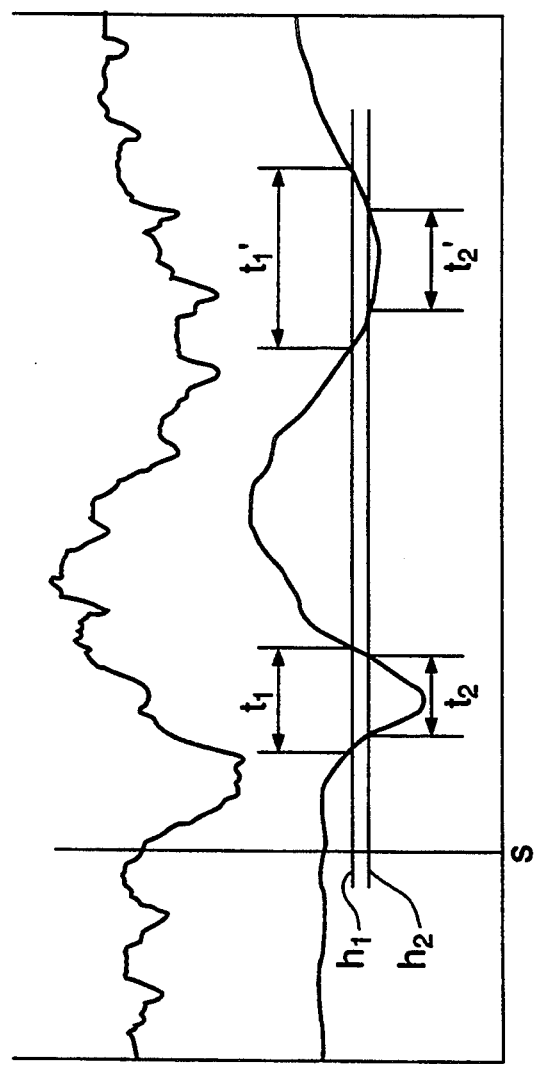
FIG. 3 is a timing chart similar to FIG. 2, which is useful in explaining another manner of detecting a misfire, employed by the first embodiment.

FIG. 3 illustrates another manner of positively discriminating a misfire from the reactionary motion, which may be carried out by the misfire-detecting system according to the present embodiment.

According to this misfire detecting manner, the reference value-setting device 11 is adapted to provide two reference values h1 and h2. The timer 13 measures the duration of the output signal from the signal-processing means 2 so long as it is lower than the reference value h1, and the duration of the same signal so long as it is lower than the reference value h2. The reference values are set such that $h1 > h2$. The time period over which the level of the output signal is lower than the reference value h1 due to a misfire is represented by t1, and that over which it is lower than the reference value h2 due to the same misfire by t2, whereas the time period over which the output signal level is lower than the reference value h1 due to the reactionary motion by t1', and that over which it is lower than the reference value h2 due to the reactionary motion by t2'

Since as described above, the reactionary motion is lower in frequency than the misfire, and accordingly a component of the output signal indicative of the reactionary motion has a longer duration, there hold the following relationships:

$$t1 < t1'$$

$$t1 - t2 < t1' - t2'.$$

Therefore, it is possible to determine a misfire by detecting whether t1 is shorter than a predetermined time period, whether t1−t2 is also shorter than a predetermined time period, and whether the level of the output signal has fallen below the reference signal h2.

Figure 4:
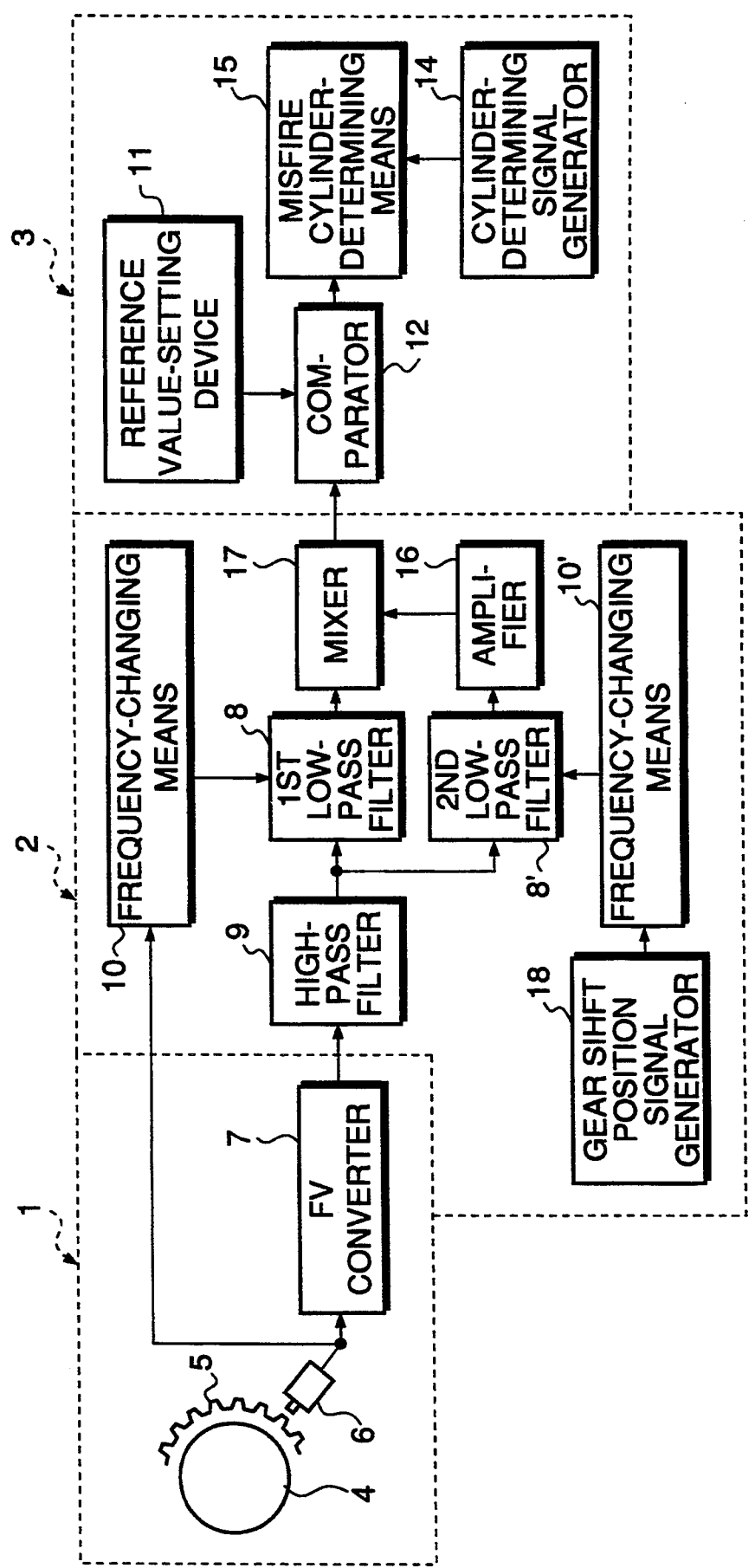
FIG. 4 is a block diagram schematically showing a misfire-detecting system for an internal combustion according to a second embodiment of the invention.

FIG. 4 shows a misfire-detecting system according to a second embodiment of the invention. The system according to this embodiment is largely distinguished from that of the first embodiment in that the low-pass filter comprises a first low-pass filter, and a second low-pass filter, the first and second low-pass filters having setting frequencies such that the phase of the waveform of an output signal from the latter is retarded by ½ or a half cycle (180 degrees) relative to that of the waveform of an output signal from the former, the two waveforms being superposed one upon the other to thereby eliminate an undulation of the waveform of the rotational speed signal caused by the reactionary motion. The component elements corresponding to those of the first embodiment are designated by the same reference numerals, and detailed description thereof is omitted.

The signal-processing means 2 according to the second embodiment comprises a high-pass filter 9 for blocking or attenuating frequencies of the rotational speed signal lower than its setting frequency, first and second low-pass filters 8, 8' for blocking or attenuating frequencies of the same signal higher than their respective setting frequencies. The second low-pass filter 8' is connected to an amplifier 16 for controlling the amplitude of an output signal from the filter 8'. The second low-pass filter 8' and the amplifier 16 are connected in parallel with the first low-pass filter 8. An output signal from the first low-pass filter 8 and the output signal from the second low-pass filter 8' are combined together by a mixer 17.

The first low-pass filter 8 and the frequency-changing means 10 correspond to and have the same functions as the low-pass filter 8 and the frequency-changing means 10 of the first embodiment.

The setting frequency of the second low-pass filter 8'0 is set such that the filter 8' outputs a signal which is retarded in phase by ½ or a half cycle relative to the phase of an undulation of the waveform of the output signal from the first low-pass filter from 8, which is caused by the reactionary motion. Therefore, the setting frequency of the second low-pass filter 8' is set to a lower value than that of the first low-pass filter 8. Further, the frequency of the reactionary motion also varies with a change in the reduction ratio of a transmission provided in the vehicle. To cope with this variation, the second low-pass filter 8' is also provided with frequency-changing means 10' for adjusting the setting frequency thereof in response to a signal indicative of the gear shift position of the transmission supplied from a gear shift position signal generator.

The mixer 17 operates to superpose the output signals from the first and second low-pass filters 8, 8', one upon the other. In this connection, the output signal from the second low-pass filter 8' is amplified by a predetermined factor by the amplifier 16.

Thus, a particular frequency component of the rotational speed signal falling within the frequency range between the setting frequencies of the high-pass filter 9 and the low-pass filter 8 is superposed on the output signal from the second low-pass filter 8', to be output from the signal-processing means 2.

The timer of the first embodiment is not used in the misfire-determining means 3 of the present embodiment.

Next, the operation of the misfire-detecting system having the above construction will be described with reference to FIG. 5.

FIG. 5(A) and (B) show, similarly to FIG. 2(A) and (B), waveforms of the cylinder-determining signal output from the cylinder-determining signal generator 14 and the output signal from the FV converter 7.

When the output signal from the rotational speed-detecting means 1 is supplied to the signal-processing means 2, first, the high-pass filter 9 eliminates low frequency components of the signal. Then, the first low-pass filter 8 eliminates high frequency components thereof. Accordingly, when a misfire occurs, the output signal from the first low-pass filter 8 has a waveform as indicated by a in FIG. 5(C), which distinctly exhibits a fall due to the misfire and an undulation due to the reactionary motion.

Further, the output signal from the high-pass filter 9 is passed through the second low-pass filter 8'0 to form a signal having a waveform retarded in phase by ½ or a half cycle of the fall or undulation relative to that of the output signal from the first low-pass filter 8. Since, the setting frequency of the second low-pass filter 8' is lower than the setting frequency of the first low-pass filter 8, the amplitude of the output signal from the former is smaller than that of the output signal from the latter. That is, the output signal from the second low-pass filter 8' has a waveform as indicated by b in FIG. 5(C). This output signal is amplified by the amplifier 16 such that the amplitude of the amplified signal becomes as close as possible to the amplitude of the output signal from the first low-pass filter 8.

Then, the output signal from the first low-pass filter 8 and the output signal from the amplifier 16 are superposed one upon the other by the mixer 17 whereby the undulations of the waveforms of the signals cancel each other to form a signal having a reduced undulation. On this occasion, the fall end in the waveform of the output signal from the first low-pass filter 8 indicative of a decrease in the rotational speed caused by the misfire is superposed on a flat portion of the waveform of the output signal from the second low-pass filter 8', so that the component indicative of this fall in the rotational speed remains almost unchanged in the waveform of the resulting composite signal.

Thus, the mixer 17 outputs a signal having a waveform indicative of a distinct fall in the rotational speed caused by the misfire, as shown in FIG. 5(D).

The output signal from the mixer 17 is then supplied to the misfire-determining means 3, in which its comparator 12 compares the signal with a reference value supplied from the reference value-setting device 11, which has a level as indicated by h in FIG. 5(D). Accordingly, the fall end end in the signal waveform caused by the misfire is determined to be lower than the reference value h. The level of the output signal from the mixer 17 never falls below this reference value unless a misfire occurs.

The comparator 12 determines that a misfire has occurred when the output level from the mixer 17 is lower than the reference value, and then outputs the misfire detection signal.

The misfire detection signal is supplied to the misfire cylinder-determining means 15 where a cylinder in which the misfire has occurred is determined. In this example, due to a time lag in the output signal from the mixer 17, which is caused by the high-pass filter 9 and the low-pass filters 8, 8', the misfire is detected when the misfire in first cylinder #1 is in the vicinity of the top dead center postion. Therefore, this time lag is corrected by the misfire cylinder-determining means 15 so that it is determined that the cylinder in which the misfire has occurred is the fourth cylinder #4.

Figure 6:
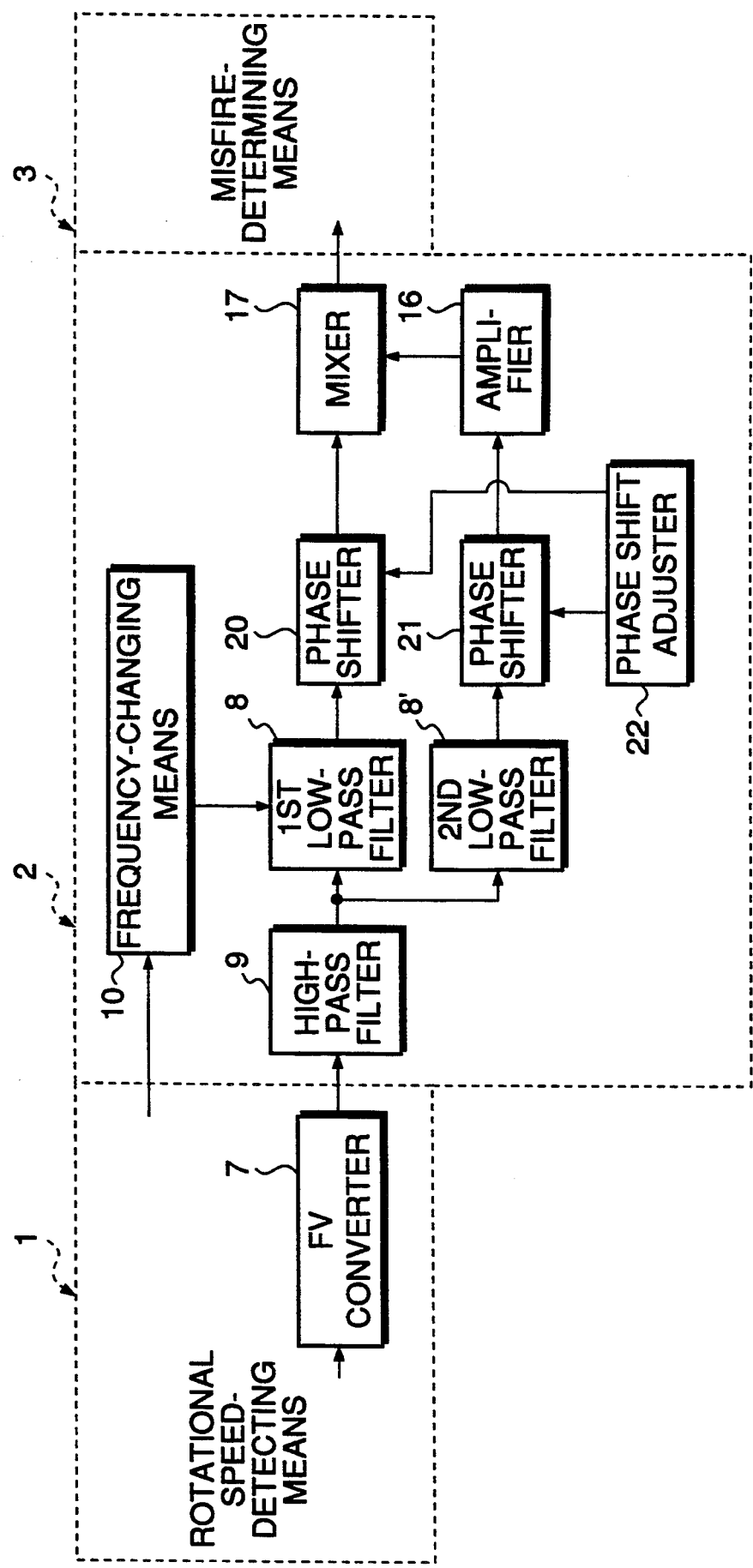
FIG. 6 is a block diagram schematically showing a misfire-detecting system for an internal combustion according to a variation of the second embodiment.

FIG. 6 shows a misfire-detecting system according to a variation of the second embodiment. In the following description, the component elements corresponding to those of the second embodiment are designated by the same reference numerals, and detailed description thereof is omitted.

According to this system, the setting frequency of the second low-pass filter 8' is always set to a constant value, which is higher than the frequency of the reactionary motion after occurrence of a misfire, but is as low as possible in order to reduce its influence on a component of the rotational speed signal indicative of a decrease in the rotational speed caused by the misfire. For example, if the frequency of the reactionary motion assumes a value of 8 hz, the setting frequency of this low pass-filter 8' is set to a value of 10 Hz.

The first and second low-pass filters 8, 8' are connected to phase shifters 20, 21, respectively. The phase shifters 20, 21 vary the phases of output signals from the respective low-pass filters 8, 8' so that the undulations in the waveforms of the output signals from the filters 8, 8', which are caused by the reactionary motion cancel each other. For example, the phase shifters 20, 21 vary the phases of the two output signals such that the phase of the output signal from the second low-pass filter 8' is retarded by ½ or a half cycle relative to the phase of the output signal from the first low-pass filter 8, or the former phase is retarded by a plurality number of cycles relative to the latter phase. The amount of shift in phase between the two output signals to be effected by the phase shifters 20, 21 are adjusted by a phase shift adjuster 22 depending on operating conditions of the vehicle.

The output signal from the second low-pass filter 8' is supplied via the phase shifter 21 to the amplifier 16, where it is amplified and then supplied to the mixer 17 to be mixed with the signal input thereto via the phase shifter 20 from the first low-pass filter 8.

The mixer 17 processes these signals, i.e. superposes the signals one upon the other in the case where the phase of the output signal from the second low-pass filter 8' is retarded by ½ or a half cycle relative to that of the output signal from the first low-pass filter 8. Alternatively, the mixer 17 operates to calculate a difference between the two signals in the case where the phase of the output signal from the second low-pass filter 8' is retarded by a plurality number of cycles relative to that of the output signal from the first low-pass filter 8.

Except for those described above, this variation is similar in construction and operation to the second embodiment shown in FIG. 4.

In the misfire-detecting system according to this variation as well, undulations in the waveform of the output signal from the first low-pass filter 8 caused by the reactionary motion and undulations in the waveform of the output signal from the second low-pass filter 8' caused by the same reactionary motion are cancelled by each other in the mixer 17, which accordingly outputs a signal indicative of only a distinct fall in the rotational speed caused by the misfire, similarly to the second embodiment shown in FIG. 4. In this connection, although a waveform portion of the output signal from the second low-pass filter 8', indicative of a decrease in the rotational speed caused by the misfire is less distinct, due to the low setting frequency, the waveform is amplified by the amplifier 16, so that the amplified signal cancels an initial large undulation in the waveform indicative of the reactionary motion. Further, the amplitude of the undulation in the waveform indicative of the reactionary motion is substantially the same between the two output signals from the first and second low-pass filters 8, 8', whereby the undulation is positively attenuated.

According to this variation, since the repetition periods or phases of the output signals from the first and second low-pass filters 8, 8' are adjusted by the phase shifters 20, 21, the adjustment of the phases can be effected even when the engine is in a low rotational speed condition.

Figure 7:
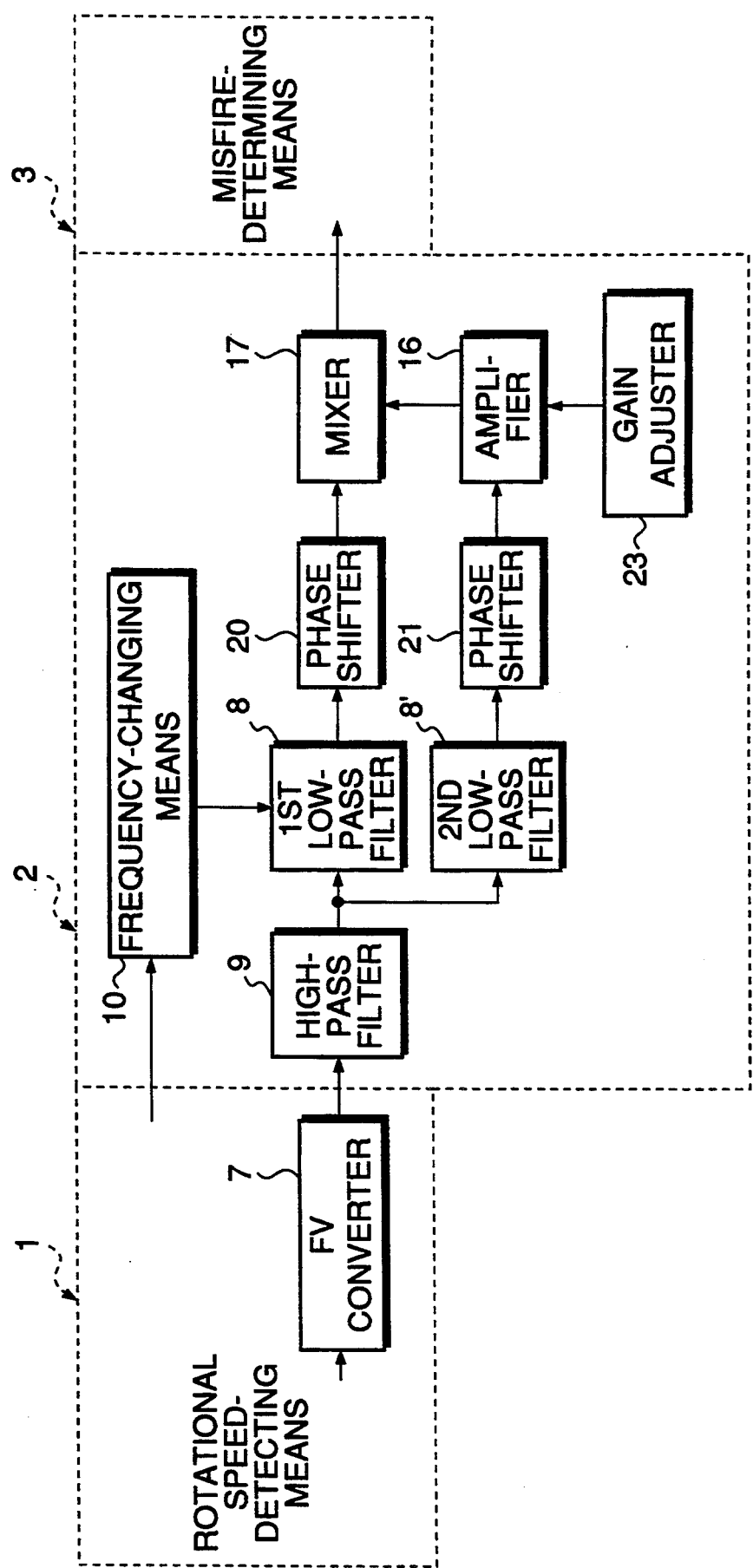
FIG. 7 is a block diagram schematically showing a misfire-detecting system for an internal combustion according to another variation of the second embodiment.

FIG. 7 shows a misfire-detecting system according to another variation of the second embodiment.

In this system as well, the setting frequency for the second low-pass filter 8' is always set to a constant value, similarly to the variation shown in FIG. 6, which is slightly higher than the frequency of the reactionary motion. The phase shifters 20, 21 are connected to the first and second low-pass filters 8, 8', respectively, to thereby adjust the phases of the output signals from the low-pass flitters to such timing that components of the signals indicative of the reactionary motion are cancelled by each other. The output signal from the second low-pass filter 8' is supplied via the phase shifter 21 to the amplifier 17, where it is amplified by a suitable gain and then supplied to the mixer 17 to be mixed with the signal inputted thereto via the phase shifter 20 from the first low-pass filter 8. The mixer 17 performs processing of the signals, such as superposition or subtraction thereof, similarly to the first-mentioned variation.

The amplitude of the undulation of the waveform of the signal caused by the reactionary motion after occurrence of a misfire depends on operating conditions of the engine, such as load on the engine. For example, when the engine is in a low load condition,, the rotational speed of the engine is maintained by inertia, so that the amplitude of the undulation of the waveform caused by the reactionary motion is small. In view of this fact, a gain adjuster 23 is connected to the amplifier 16 to control the gain of the amplifier in response to operating conditions of the engine.

Figure 8:
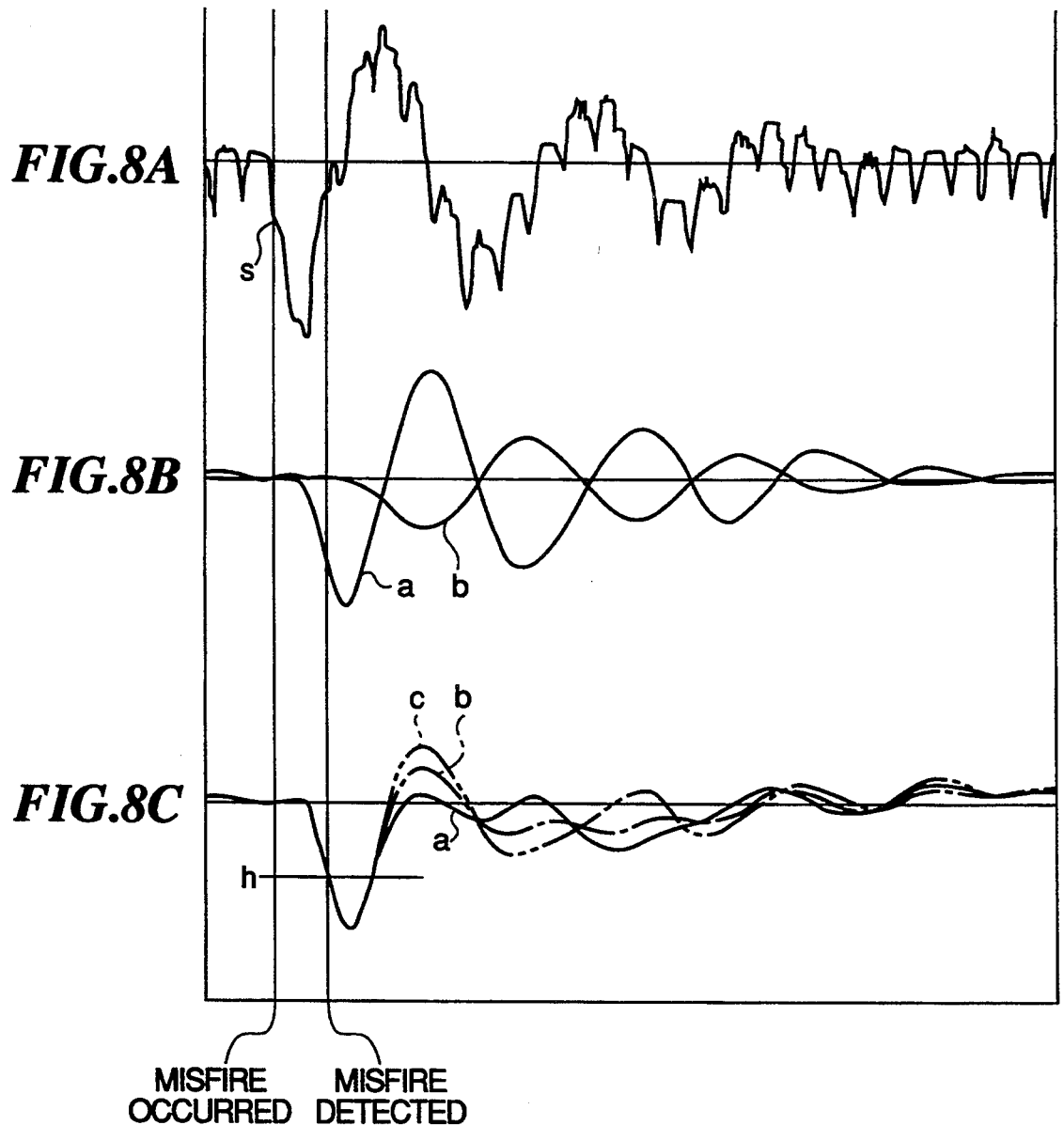
FIG. 8 is a timing chart showing waveforms of signals output from component parts of the misfire-detecting system of FIG. 7, which is useful in explaining a manner of detecting a misfire based on the signal waveforms.

In the misfire-detecting system constructed as above, let it be assumed that the FV converter 7 of the rotational speed-detecting means 1 outputs a signal indicative of a variation in the rotational speed of the engine having a waveform as shown in FIG. 8(A). The signal outputted via the phase shifter 20 from the first low-pass filter 8 has a waveform as indicated by a in FIG. 8(B).

Further, assuming that the phase shifter 21 connected to the second low-pass filter 8' retards the phase of the outpost signal therefrom by ½ or a half cycle relative to that of the output signal from the phase shifted 20 connected to the first low-pass filter 8, the output signal from the phase shifter 21 has a waveform as indicated by b in the figure.

The output signal from the phase shifter 21 connected to the second low-pass filter 8' is amplified by the amplifier 16, and then superposed on the output signal from the first low-pass filter 8' in the mixer 17, which outputs a signal having a waveform shown in FIG. 8(C). If the amplification factor of the amplifier 16 is 1.0, the output signal from the mixer 17 has a waveform as indicated by c therein, if 1.5, a waveform as indicated by b, and if 2.0, a waveform as indicated by a.

Thus, by changing the gain of the amplifier 16 in accordance with operating conditions of the engine, the amplitude of the undulation in the waveform indicative of the reactionary motion, which varies with operating conditions of the engine, can be properly reduced. Therefore, the output signal from the mixer 17 has a waveform which is indicative of a distinct fall in the rotational speed of the crankshaft caused by the misfire, and hence it is possible to accurately determine occurrence of a misfire by comparing the output signal from the mixer 17 with the reference value.

Then, the time point at which occurrence of the misfire has been detected is corrected by a time lag caused by the filters 9, 8, 8' and the phase shifters 20, 21, and the corrected time point is checked with the cylinder-determining signal to thereby identify a cylinder in which the misfire has occurred.

Although, in the above described embodiments and variations, the ring gear 5 mounted on the fly-wheel 4 is used as the rotary member for detecting the rotational speed of the engine, this is not limitative, but the rotational speed of the engine or the crankshaft can be detected by crank pulses. Further, purely mechanical means may be also employed for detecting the rotational speed and outputting an analog signal indicative of the engine rotational speed.

Figure 9:
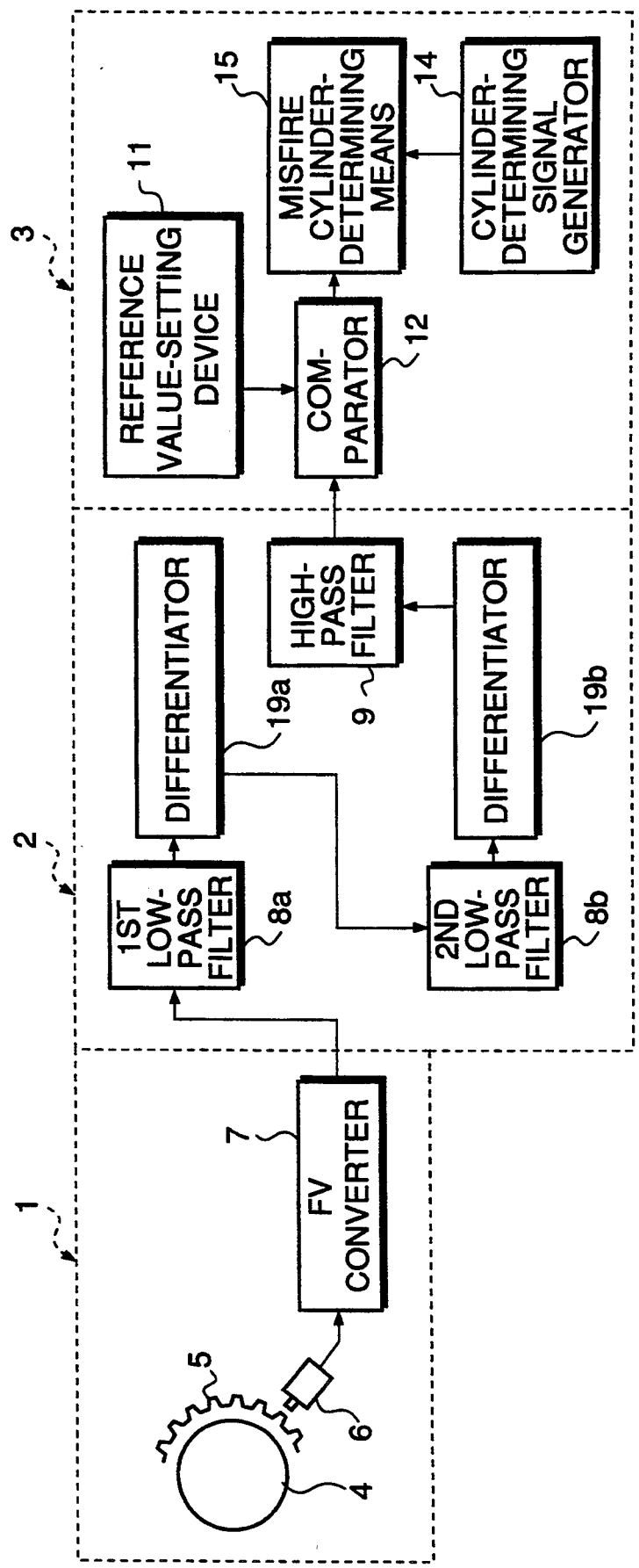
FIG. 9 is a block diagram schematically showing a misfire-detecting system for an internal combustion according to a third embodiment of the invention.

FIG. 9 shows a misfire-detecting system according to a third embodiment of the invention. The component elements corresponding to those of the first embodiment shown in FIG. 1 are designated by the same reference numerals, and detailed description thereof is omitted.

In this embodiment, the signal-processing means 2 comprises filter means formed of low-pass filters for blocking or attenuating frequencies higher than respective setting frequencies thereof, and a high-pass filter for blocking or attenuating frequencies lower than a setting frequency thereof, and differentiating means formed of differentiators for outputting signals obtained by differentiating input signals thereto. The low-pass filters and differentiators are provided in two stages each formed of a combination of a low-pass filter and a differentiator. More specifically, the signal supplied from the FV converter of the rotational speed-detecting means 1 is first supplied to a first low-pass filter 8a, and subsequently to a differentiator 19a, and also to a second low-pass filter 8b, and subsequently to a differentiator 19b. An output signal from the differentiator 16b is supplied to a high-pass filter 9.

The first low-pass filter 8a eliminates components of the output signal from the FV converter 7 corresponding to a variation in the rotational speed having a frequency twice as high as the frequency of rotation of the crankshaft of the engine, i.e. the rotational speed of the engine in the case of a four cylinder-type engine, or a variation in the rotational speed having a frequency three times as high as the frequency of rotation of the crankshaft i.e. the engine rotational speed in the case of a six cylinder-type engine. The setting frequency is therefore set to a constant value which is lower than the frequency twice or three times as high as the normal frequency of rotation of the engine but higher than the frequency of variation in the rotational speed caused by a misfire. The setting frequency of the second low-pass filter 8b is also set to a similar value.

On the other hand, the high-pass filter 9 eliminates components of the above output signal corresponding to variations in the rotational speed occurring while the vehicle is travelling on a rough road and a variation in the rotational speed caused by the reactionary motion occurring after a misfire. The setting frequency thereof is set to a value slightly higher than the frequency of the reactionary motion.

Thus, the signal-processing means 2 outputs a signal having a particular frequency component between the setting frequency of the first low-pass filter 8a and the setting frequency of the high-pass filter 9.

The misfire-determining means 3 is provided with the comparator 12 for comparing the output from the signal-processing means with the reference value supplied from the reference value-setting device 11, similarly to the first embodiment shown in FIG. 1. The comparator 12 outputs the misfire detection signal when the output from the signal-processing means lower than the reference value.

The misfire detection signal is compared in the misfire cylinder-determining means 15 with the cylinder-determining signal supplied from the cylinder-determining signal generator 14, and a time lag of the output signal from the comparator 12 signal caused by the filters 8a, 8b, 9, and an advance in phase caused by the differentiators 19a, 19b are corrected to thereby determine a cylinder in which the misfire has occurred.

Figure 10:
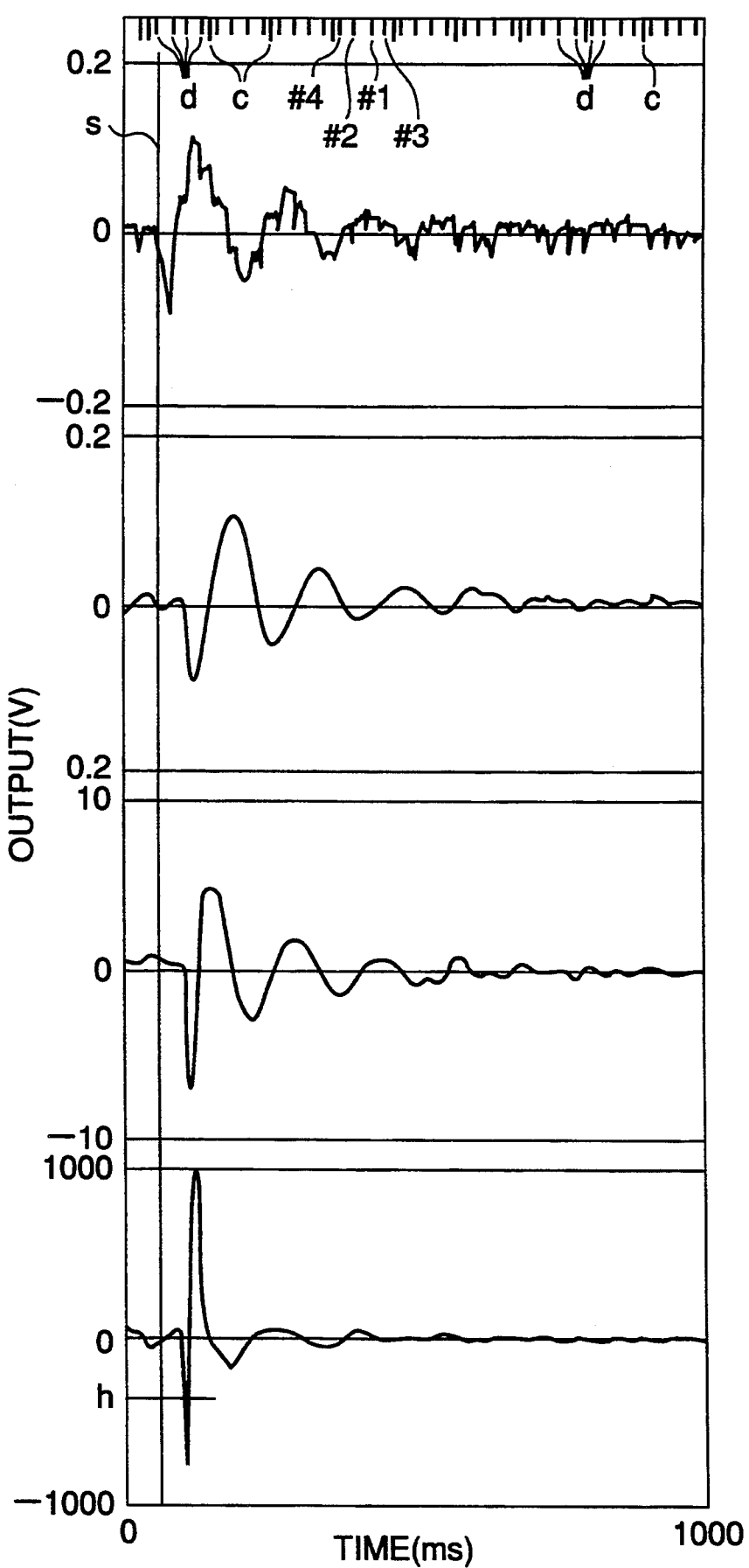
FIG. 10 is a timing chart showing waveforms of signals outputted from component parts of the misfire-detecting system of FIG. 9, which is useful in explaining a manner of detecting a misfire based on the signal waveforms.

In the misfire-detecting system constructed as above, similarly to the FIG. 1 embodiment, in the case of a four cylinder-type internal combustion engine, the cylinder-determining signal generator 14 outputs the cylinder-determining signal formed of a combination of TDC signal pulses d generated at the cylinders and cylinder-discriminating signal pulses c, as shown in FIG. 10(A).

When the ignition of each cylinder is normally effected, the FV converter 7 of the rotational speed-detecting means 1 outputs a signal having a waveform containing various frequency components as shown in a left end portion of the waveform as viewed in FIG. 10(B).

Now, assuming that a misfire has occurred at a time point s, i.e. in the fourth cylinder #4, then the rotational speed of the crankshaft decreases to cause the waveform of the output signal from the rotational speed-detecting means 1 to fall largely. The reactionary motion of the main body of the engine due to the misfire, causes the engine rotational speed to rise, and then it falls again. Therefore, the waveform of the output signal from the rotational speed-detecting means 1 has an undulation as shown in FIG. 10(B).

When the output signal from the rotational speed-detecting means 1 having the above described waveform is supplied to the signal-processing means 2, the first low-pass filter 8a eliminates high frequency components thereof, and hence components of the signal indicative of the variation in the rotational speed twice or three times as high as the frequency of the engine rotational speed. The output signal from the first low-pass filter 8 is delayed in phase relative to that of the original rotational speed signal due to a time lag produced by the low-pass filter 8a. As a result, the output signal from the first low-pass filter 8a has a waveform as shown in FIG. 10(C), which is indicative of a distinct fall in the engine rotational speed caused by the misfire and a distinct undulation caused by the reactionary motion. This signal contains low frequency components indicative of variations in the engine rotational speed occurring when the vehicle is travelling on a rough road.

Then, the output signal from the first low-pass filter 8a is differentiated by the differentiator 19a, which outputs a signal having a waveform advanced in phase and increased in amplitude. The rate of increase in amplitude is higher as the frequency is higher. Therefore, the amplitude of a portion of the waveform indicative of the fall in the engine rotational speed caused by the misfire becomes much larger than that of the undulation in the waveform indicative of the variation in the engine rotational speed caused by the reactionary motion. On the other hand, the repetition period of the variation in the engine rotational speed caused by the reactionary motion is substantially constant, so that the repetition period remains unchanged even after the differentiation. As a result, the output signal from the differentiator 19a has a waveform as shown in FIG. 10(D). That is, in this waveform, it appears as if a component indicative of the fall in the engine rotational speed were increased in frequency.

Then, the output signal from the differentiator 19a is passed through the second low-pass filter 8b, and subsequently differentiated at the differentiator 19b. As a result, components of the signal are eliminated which have frequencies higher than the frequency of the component indicative of the fall in the rotational speed caused by the misfire, while the component indicative of the fall is made even more conspicuous or distinct. Thus, the output signal from the differentiator 19b has a waveform as shown in FIG. 10(E). In this connection, the scale of FIG. 10(D) is greater than that of FIG. 10(C), and that of FIG. 10(E) is even greater than that of FIG. 10(D).

The output signal from the differentiator 19b is passed through the high-pass filter 9, where low frequency components of the output signal lower in frequency than the frequency of the reactionary motion are eliminated, that is, components indicative of variation in the engine rotational speed caused by the reactionary motion and variations therein occurring when the vehicle is travelling are eliminated. Since the component indicative of the fall in the engine rotational speed caused by the misfire has a conspicuous and sharp feature as described above, it still appears distinct even after the signal passes the high-pass filter 9.

Thus, the signal-processing means 2 outputs a signal having a waveform indicative of a distinct fall in the engine rotational speed caused by the misfire.

Then, the output signal from the signal-processing processing means 2 is supplied to the misfire-determining means 3, in which the comparator 12 compares the signal with the reference value supplied from the reference value-setting device 11. The reference value has a level as indicated by h in FIG. 10(E). Therefore, the fall end in the waveform caused by the misfire becomes lower than the reference value, but never becomes lower than the latter in cases other than the occurrence of the misfire.

Thus, the comparator 12 compares the output from the signal-processing means 2 with the reference value, and determines that a misfire has occurred when the latter is lower than the former, to output the misfire detection signal.

The misfire detection signal is then supplied to the cylinder-determining means 15, where a cylinder in which the misfire has occurred is identified. On this occasion, due to delayed timing of the signal caused by the filters 8a, 8b, 9 and advanced phase thereof caused by the differentiators 19a, 19b, the determination of occurrence of the misfire is carried out at a time point different from the time point at which the misfire actually occurred. The misfire cylinder-determining means 15 corrects this timing difference before it determines the cylinder in which the misfire occurred.

Thus, the misfire-detecting system of the present embodiment detects a misfire based on a signal having a waveform from which components thereof are eliminated, which are indicative of variations in the engine rotational speed caused by factors other than the misfire and a variation therein caused by the reactionary motion following the misfire, which enables to accurately detect a misfire and positively determine a cylinder in which the misfire occurred.

Low-pass filters and differentiators may be provided in three or more stages, instead of two stages. Further, depending on the use, they may be provided only in one stage.

The frequency of vibration caused by the reactionary motion following a misfire varies with the reduction ratio of the transmission. Therefore, it is preferred that the setting frequency of the high-pass filter is changed according to the gear shift position of the transmission.

In the above described embodiments and variations, the rotational speed signal is processed in an analog manner. However, the signal may be 15 digitally processed. This can simplify the construction of the misfire-detecting system. For example, the first embodiment shown in FIG. 1 requires the use of the frequency-changing means 10 for changing the setting frequency of the low-pass filter 8 according to the engine rotational speed. However, if the signal is digitally processed, the sampling frequency automatically changes with the engine rotational speed, which enables to dispense with such frequency-changing means.

Figure 11:
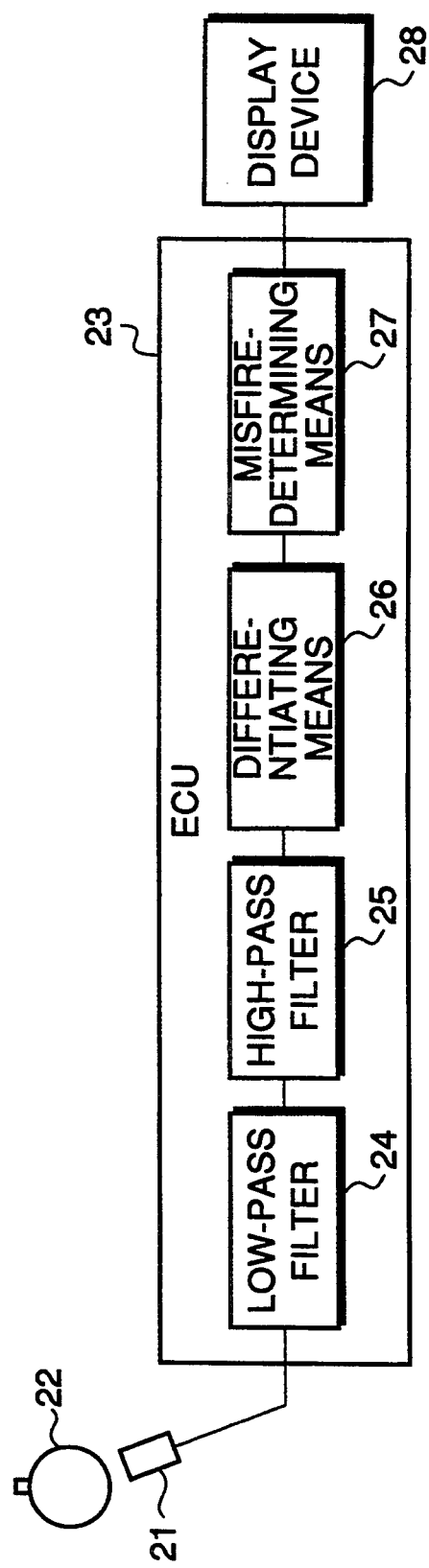
FIG. 11 is a block diagram schematically showing a misfire-detecting system for an internal combustion according to a fourth embodiment of the invention.

FIG. 11 schematically shows a misfire-detecting system according to a fourth embodiment of the invention, in which the rotational speed signal is digitally processed to detect a misfire.

This system uses a crank angle sensor 21 as rotational speed-detecting means for detecting the rotational speed of the crankshaft, i.e. the engine. The crank angle sensor 21 is mounted on a camshaft 22 which rotates synchronously with the crankshaft at half the speed of the latter. It outputs one pulse whenever the camshaft rotates through 15°, i.e. whenever the crankshaft rotates through 30°. A crank pulse signal from the crank angle sensor 21 is supplied to a signal-processing unit 23 formed by a microcomputer.

The signal-processing unit 23 comprises, if expressed functionally, filter means for filtering a signal input thereto to pass a particular frequency component of the signal therethrough, which is formed of a low-pass filter 24 and a high-pass filter 25, differentiating means 26 for differentiating an output signal from the filter 24, and misfire-determining means 27 for determining occurrence of a misfire based on an output signal from the differentiating means 26. An output signal from the signal-processing unit is supplied to a display device 28, such as a display or a printer, to indicate occurrence of a misfire when the misfire occurred.

The low-pass filter 24 and the high-pass filter 25 are formed of digital filters called Butterworth filters for digitally filtering pulses input thereto. They have respective predetermined transfer function characteristics, and their gains are variable. The low-pass filter 24 has a characteristic of attenuating frequencies substantially equal to or higher than the frequency of TDC pulses, while the high-pass filter 25 has a characteristic of attenuating frequencies equal to or lower than the frequency of TDC pulses.

The differentiating means 26 calculates the difference between the present input value and the immediately preceding input value. The misfire-determining means 27 compares the input value with a reference value, and determines that misfire occurred when the former is larger than the latter to output a misfire detection signal. The reference value is determined as a function of the engine rotational speed Ne, the intake pipe negative pressure Pb, vehicle speed V, and the gear shift position of the transmission, and read from a map stored in the microcomputer.

Figure 12:
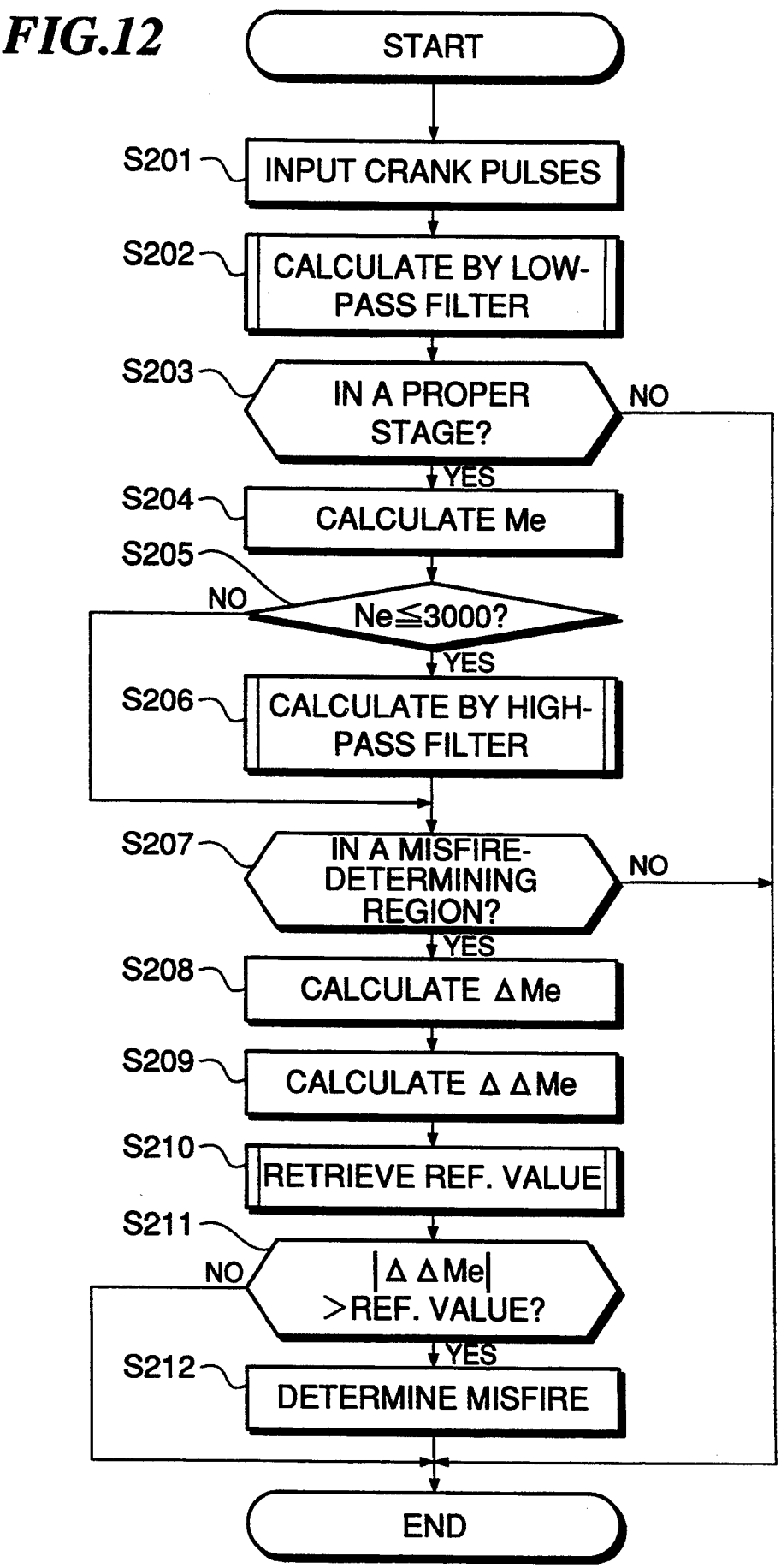
FIG. 12 a flowchart showing a manner of processing a signal, which is carried out by the system of FIG. 11.

The signal-processing unit 23 processes crank pulses supplied from the crank pulse sensor 21 according to a program shown in FIG. 12.

At the start of processing, a crank pulse is inputted at a step S201. Then at a step S202, whenever a crank pulse is input, the low-pass filter 24 calculates an output value according to its own filtering characteristic. The calculation is carried out by the use of the following formula:

$$y(k)=b_1u(k)+b_2u(k-1)+b_3u(k-2)-a_2y(k-1)-a_3y(k-2)$$

wherein u(k) represents input data, y(k) output data, $b_1$, $b_2$, $b_3$, $a_2$, and $a_3$ predetermined constants set for eliminating high frequency noise from the input data. They are set to such values that, for example, when a Nyquist frequency which is half the sampling frequency assumes a value of 600 Hz, the low-pass filter has an attenuating characteristic of $-3$ dB or less at 200 Hz, and $-19$ dB or more at 400 Hz.

Then, at a step S203, it is determined whether a proper stage has been reached, i.e. whether or not 6 crank pulses have been counted in the case of a four cycle/four cylinder type engine. If the proper stage has not been reached, the state of the signal-processing unit is held as it is. If it is determined that the proper stage has been reached, at a step S204, a calculation is made of a time interval Me, i.e. a time period over which the crankshaft rotates through a predetermined angle (180° in the case of the four cylinder type engine). The time interval Me is the sum of six crank pulse intervals Cr between the six crank pulses having been so far inputted, i.e. it is calculated by the use of the following formula:

$$Me=Cr_n+Cr_{n-1}+\ldots+Cr_{n-5}.$$

Thus, whenever any of the cylinders reaches its TDC position, a pulse having a magnitude Me indicative of a time period elapsed between the present TDC position reached by the cylinder and the immediately preceding TDC position reached by another cylinder immediately preceding in the order of ignition. Then, at a step S205, it is determined whether or not the engine rotational speed Ne is in a low speed range such as a range not higher than 3000 rpm. If it is determined that the engine rotational speed Ne is in the low speed range, at a step S205, the high-pass filter 25 calculates, based upon the Me pulse, an output value according to its own filtering characteristic. The calculation is carried out by the use of a formula similar to that applied to calculation by the low-pass filter 24, in which, however, the coefficients are changed to such values as will enable the high-pass filter to eliminate low frequency noise produced during travelling of the vehicle on a rough road or influence of the reactionary motion following a misfire. Specifically, they are set to such values that, for example, when the Nyquist frequency assumes a value of 600 Hz, the high-pass filter has an attenuating characteristic of $-3$ dB or less at 70 Hz, and $-14$ dB or more at 30 Hz. Further, it should be noted that when the engine rotational speed Ne is high, the step S206 is skipped over, i.e. the calculation by the high-pass filter 25 is not performed.

Then, at a step S207, it is determined whether or not the engine is in a misfire-determining condition. Detection of misfire is not carried out immediately after the start of the engine, at rapid acceleration or deceleration of same, or when load on the engine has changed, since on such occasions noise becomes greater to increase the probability of erroneous detection of misfire. In these engine conditions, i.e. when it is determined that the engine is not in the misfire-determining condition, the state of the signal-processing unit is held as it is.

On the other hand, if it is determined that the engine is in the misfire-determining condition, at a step S208, an amount of change ΔMe in the time interval Me is calculated by the following formula:

$$\Delta Me=Me_n-Me_{n-1}.$$

The amount of change ΔMe is a differential value of Me, and corresponds to the rotational angular acceleration of the crankshaft.

Further, at a step S209, a difference ΔΔMe between the present amount of change ΔMe and a mean value of the preceding four values of ΔMe is calculated by the following formula:

$$\Delta\Delta Me=\Delta Me_n-(\Delta Me_{n-1}+\Delta Me_{n-2}+\ldots a\Delta Me_{n-2})/4$$

The difference ΔΔMe is a differential value of ΔMe and indicates a change in the rotational angular acceleration of the crankshaft.

Then, at a step S210, a reference value for determining occurrence of a misfire is retrieved from a map. At the following step S211, the difference ΔΔMe is compared with the reference value read at the step S210, and at a step S212, the misfire detection signal is output when the absolute value of the former is larger than the reference value.

In the misfire-detecting system constructed as above, crank pulses output from the crank angle sensor 21 are subjected to low-pass filtering at the signal-processing unit 23 whereby high frequency noise components such as a component of a frequency twice as high as the number of rotation of the engine per unit time are eliminated. Therefore, Me pulses calculated from the crank pulse signal contain no high frequency noise. Further, when the engine rotational speed Ne is low, the Me pulses are subjected to high-pass filtering to thereby also eliminate low frequency noise components produced during travelling of the vehicle on a rough road or by the reactionary motion following a misfire. As a result, the resulting signal used for determination of occurrence of a misfire is formed solely of a component close to the frequency of TDC pulses, which is indicative of a variation in the engine rotational speed caused by a misfire.

In the signal-processing, if the engine rotational speed Ne is in a high speed range, high-pass filtering of the signal is not carried out. That is, with reference to FIG. 11, the high-pass filter 25 is made inoperative. In the high engine rotational speed region, there arise no problems of erroneous detection due to travelling of the vehicle on a rough road or erroneously repeated detection of the same misfire due to the reactionary motion following the misfire. On the other hand, high-pass filtering can unfavorably spoil the level of the absolute value of input data. Therefore, high-pass filtering is carried out only when the engine is in the low rotational speed region. Further, preferably, the misfire determination should be inhibited when the engine rotational speed switches between the low speed region and the high speed region.

When ignition of the cylinders is normally carried out, the value of the time interval Me is held substantially at a constant value, and hence the amount of change ΔMe is small, and the difference ΔΔMe is very small. Therefore, no misfire detection signal is output. However, when a misfire has occurred in a cylinder, the time interval Me which elapses until the following cylinder reaches its TDC position becomes larger, and hence the amount of change ΔMe becomes larger, so that the absolute value of the difference ΔΔMe becomes larger than the reference value. As a result, the misfire detection signal is output from the signal-processing unit, and the display device 28 indicates the detection of the misfire.

As described above, a misfire can be accurately detected by digitally processing the signal indicative of the rotational speed of the engine. This enables the system to process the rotational speed signal by the use of software, to thereby enhance the detecting accuracy while simplifying the construction of the system to reduce the manufacturing cost.

In this embodiment as well, there is a time lag between the time point of actual occurrence of a misfire and the time of detection of same, produced by the characteristics of the low-pass filter 24 and the high-pass filter 25. Therefore, the misfire-determining means 27 is provided with misfire cylinder-determining means for identifying a cylinder in which the misfire has occurred, by correcting the time lag.

In this embodiment, TDC pulses may be used instead of crank pulses. Further, in the embodiments and variations shown in FIGS. 1 to 9, a crank angle sensor may be used instead of the ring gear 5.

Figure 13:
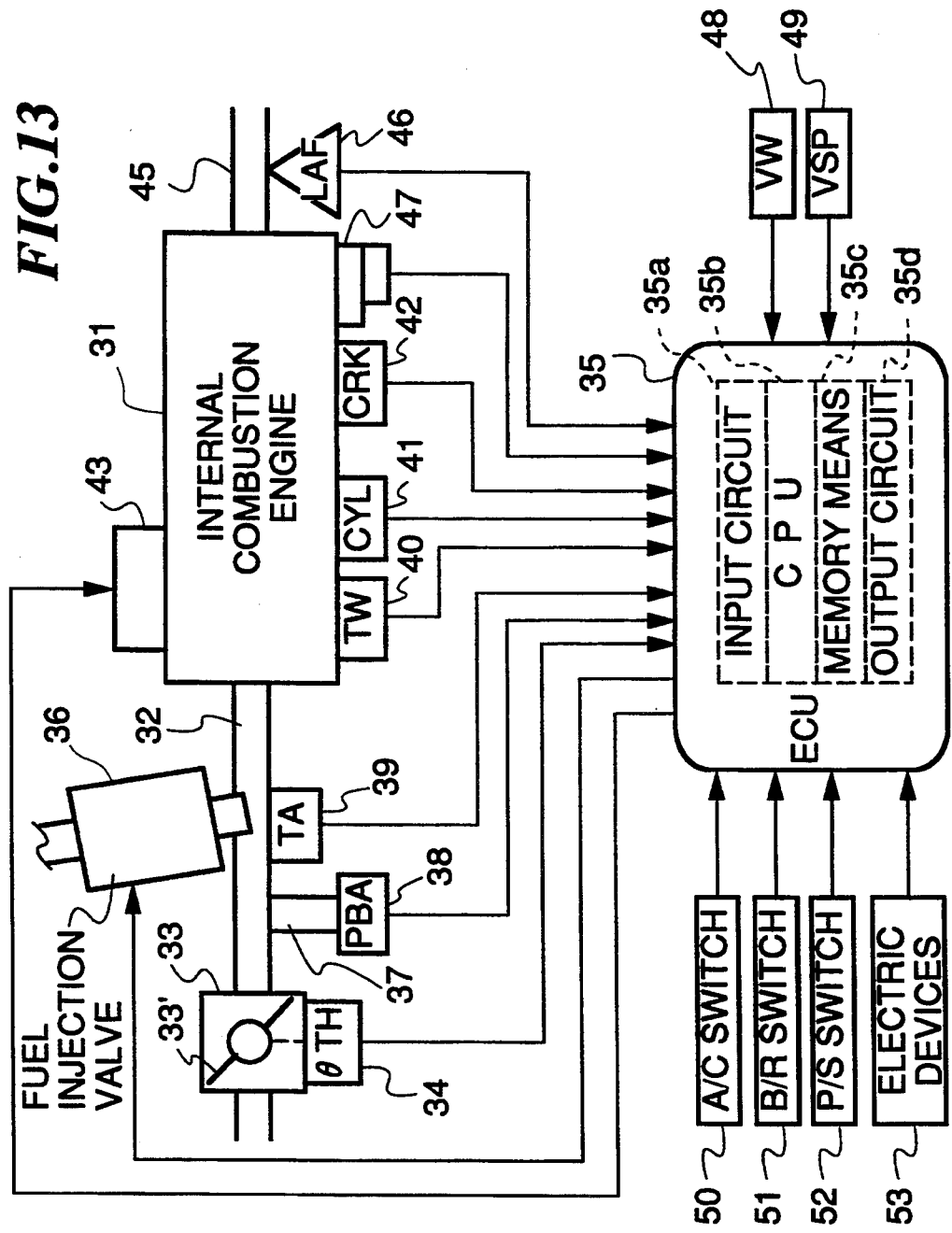
FIG. 13 is a block diagram schematically showing the whole arrangement of a misfire-detecting system for an internal combustion engine according to a fifth embodiment of the invention.

FIG. 13 shows the whole arrangement of a misfire-detecting system according to a fifth embodiment of the invention.

In the figure, reference numeral 31 designates a DOHC in-line four cylinder-type internal combustion engine (hereinafter simply referred to as "the engine") having a pair of intake valves, not shown, and a pair of exhaust valves, not shown, provided for each cylinder.

Mounted across an intake pipe 32 of the engine 31 is a throttle body 33 in which is arranged a throttle valve 33'. Connected to the throttle valve 33' is a throttle valve opening (θTH) sensor 34 for detecting the opening of the throttle valve 33' and supplying an electric signal indicative of the detected throttle valve opening to an electronic control unit (hereinafter referred to as "the ECU") 35.

Fuel injection valves 36 are each provided for each cylinder and arranged in the intake pipe at a location between the engine 31 and the throttle valve 33' and slightly upstream of the intake valves. The fuel injection valves 6 are connected to a fuel pump, not shown, and electrically connected to the ECU 35 to have their valve opening periods controlled by signals therefrom.

On the other hand, a branch conduit 37 is connected to the intake pipe 32 at a location immediately downstream of the throttle valve 33'. Mounted at an end of the branch conduit 37 is an intake pipe absolute pressure (PBA) sensor 38 electrically connected to the ECU 35 for converting the sensed absolute pressure PBA into an electric signal indicative thereof and supplying same to the ECU 5.

An intake air temperature (TA) sensor 39 is inserted into the intake pipe 32 at a location downstream of the intake pipe absolute pressure sensor 38 for supplying an electric signal indicative of the sensed intake air temperature TA to the ECU 5.

An engine coolant temperature (TW) sensor 40, which may be formed of a thermistor or the like, is mounted in the coolant-filled cylinder block of the engine 31 for supplying an electric signal indicative of the sensed engine coolant temperature TW to the ECU 5. A cylinder-discriminating (CYL) sensor 41 and a crank angle sensor (CRK) 42 are arranged in facing relation to a camshaft or a crankshaft of the engine 31, neither of which is shown.

The CYL sensor 41 generates a pulse (hereinafter referred to as "the CYL signal pulse") at a predetermined crank angle of a particular cylinder of the engine whenever the crankshaft rotates two rotations, and supplies the CYL signal pulse to the ECU 35.

The CRK sensor 42 generates a pulse (hereinafter referred to as "CRK signal pulse") at predetermined crank angle intervals (e.g. whenever the crankshaft rotates through 30°) and supplies the CRK signal pulse to the ECU 35.

A spark plug 43 of each cylinder of the engine 31 is electrically connected the ECU 35 and has its ignition timing controlled by the ECU 35.

An oxygen concentration sensor (referred to hereinafter as "the LAF sensor") 46 is mounted in an exhaust pipe 45, for supplying an electric signal indicative of the oxygen concentration in the exhaust gases to the ECU 35.

A transmission 47, which is formed by a known automatic transmission (AT) or a known manual transmission (MT), is provided in a drive force transmission system connecting between the engine 31 and driving wheels, not shown, of the vehicle, and electrically connected to the ECU 35.

Further, also connected to the ECU 35 are a driving wheel speed (VW) sensor 48 and a trailing wheel speed sensor (i.e. vehicle speed (VSP) sensor) 49 for supplying an electric signal indicative of the driving wheel speed (VW) detected by the VW sensor 48 and an electric signal indicative of the vehicle speed (VSP) detected by the VSP sensor 49 to the ECU 35.

Further, various switches, such as an air-conditioner switch 50, a brake light switch 51, and a power steering switch 52, are connected to the ECU 35 for supplying respective electric signals indicative of closing or opening thereof to the ECU 35.

The ECU 35 comprises an input circuit 35a having the functions of shaping the waveforms of input signals from various sensors as mentioned above, shifting the voltage levels of sensor output signals to a predetermined level, converting analog signals from analog-output sensors to digital signals, and so forth, a central processing unit (hereinafter referred to as "the CPU") 35b, memory means 35c formed of a ROM and a RAM storing various operational programs which are executed by the CPU 35b, and various maps, referred to hereinafter, and for storing results of calculations therefrom, etc., an output circuit 35d which outputs driving signals to the fuel injection valves 36 and the spark plugs 43, respectively.

The CPU 5b operates in response to the above-mentioned signals from the sensors to determine operating conditions in which the engine 31 is operating, such as an air-fuel ratio feedback control region and open-loop control regions, and calculates, based upon the determined engine operating conditions, the valve opening period or fuel injection period TOUT over which the fuel injection valves 36 are to be opened by the use of the following formula (1) and stores the results of calculation into the memory means (RAM) 35c.

$$TOUT = Ti \times KLAF \times KLS \times K1 + K2 \quad (1)$$

wherein Ti represents a basic fuel injection amount determined according to the engine rotational speed NE and the intake pipe absolute pressure PBA. As Ti maps used in determining the value of Ti, there are stored in the memory means 35c (ROM) a TiCR map to be used when the engine is in a starting mode, and a TiM map to be used when the engine is in a basic mode.

KLAF represents an air-fuel ratio correction coefficient which is set to such a value as will make the air-fuel ratio detected by the LAF sensor 46 equal to a desired air-fuel ratio during air-fuel ratio feedback control, and to predetermined values depending on operating conditions of the engine during open loop control.

KLS represents a leaning correction coefficient which is set to predetermined values corresponding to respective operating regions of the engine. In this connection, the coefficient KLS is always set to a value of 1.0 when the engine is in the starting mode.

K1 and K2 are other correction coefficients and correction variables, respectively, which are calculated for each cylinder based on various engine parameter signals to such values as to optimize characteristics of the engine such a fuel consumption and accelerability depending on engine operating conditions.

The CPU 35b calculates a slip rate λ based on the driving wheel speed VW and the vehicle speed VSP by the use of the following formula (2):

$$\lambda = (VW - VSP)/VW \quad (2)$$

So far as the slip control is concerned, the CPU 35b comprises a driving wheel slip control system (i.e. a traction control system, hereinafter referred to as "the TCS") for controlling excessive slippage of the driving wheels by reducing the torque of the driving wheels according to the slip rate λ.

Figure 14:
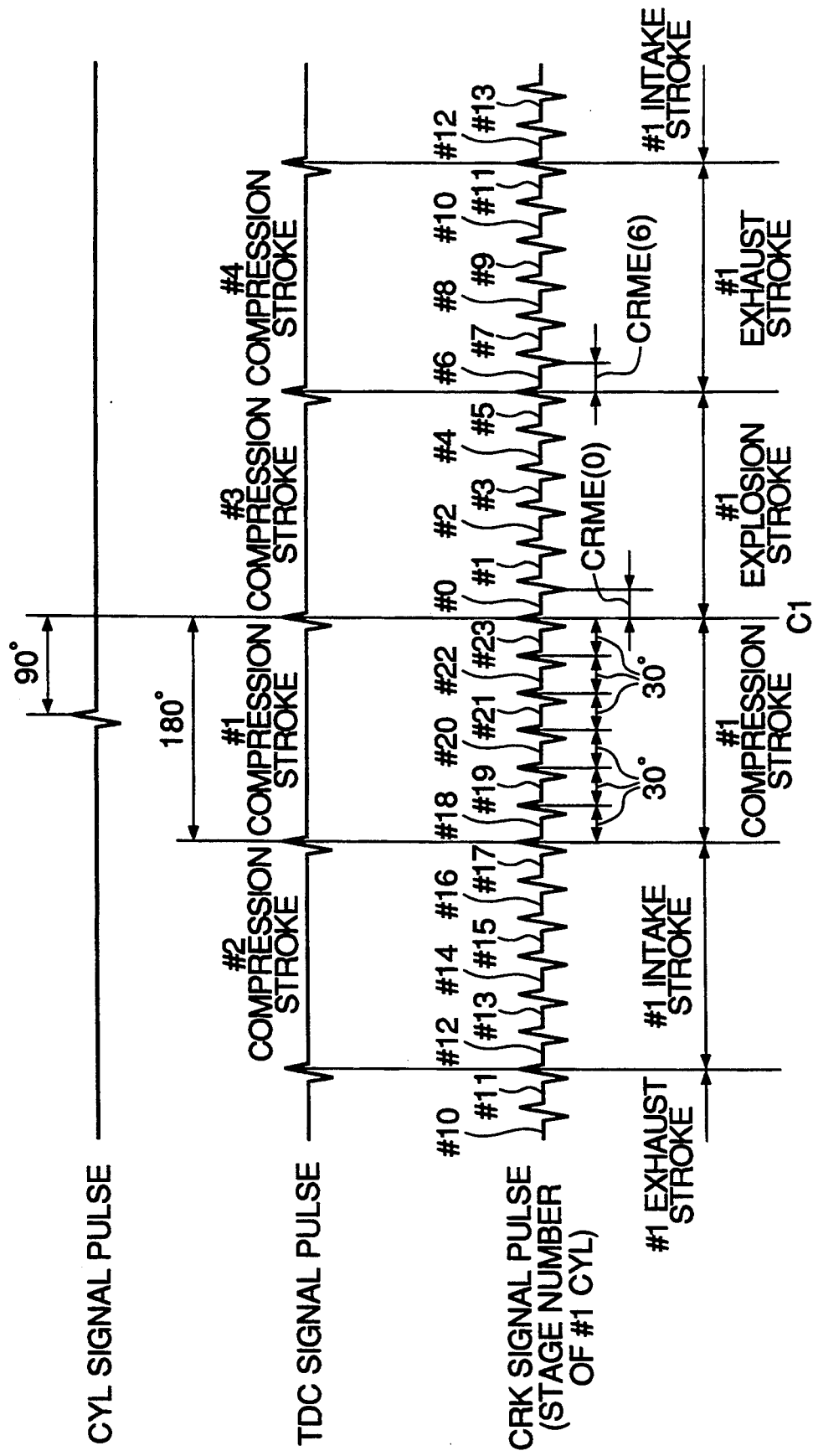
FIG. 14 is a timing chart showing CYL signal pulses, TDC signal pulses, and CRK signal pulses.

FIG. 14 shows a timing chart showing timing of occurrence of CYL signal pulses output from the CYL sensor 41 and CRK signal pulses output from the CRK sensor 42.

The CRK sensor 42 generates e.g. 24 CRK signal pulses whenever the crankshaft rotates two rotations, i.e. one pulse whenever the crankshaft rotates through 30°. The ECU 35 generates a TDC signal pulse whenever 6 CRK signal pulses are counted (i.e. whenever the crankshaft rotates through 180°) to detect a reference crank angle position of each cylinder. Further, the ECU 35 measures a tinge interval CRME of occurrence of each two adjacent CRK signal pulses, and calculates the sum ME of the measured values CRME over a time interval of occurrence of each two adjacent TDC pulses and then calculates the engine rotational speed NE, which is the reciprocal of the ME value.

A CYL signal pulse is generated at a predetermined crank angle position (e.g. 90° BTDC) of a particular cylinder (e.g. #1 CYL) preceding a TDC signal pulse position of the cylinder at which is generated a TDC signal pulse which is indicative of termination of the compression stroke of the cylinder, whereby a particular cylinder number (e.g.#1 CYL) is assigned to the TDC signal pulse generated immediately after occurrence of the CYL signal pulse.

Further, the ECU 35 determines crank angle stages (hereinafter referred to as "stages") reached by each cylinder after the reference crank angle position thereof, based on TDC signal pulses and CRK signal pulses. More specifically, assuming that a CRK signal pulse C1 is generated synchronously with occurrence of a TDC signal pulse, at a TDC signal position corresponding to termination of the compression stroke of #1 CYL, the ECU 35 detects a #0 stage of #1 CYL by the CRK signal pulse, and successively detects a #1 stage, a #2 stage, ..., a #23 stage by CRK signal pulses generated thereafter.

The CPU 35b forms, if expressed functionality, the signal-processing means, i.e., a high-pass filter and a low-pass filter as filter means, changeover means for determining selection of one or none of the filters, and differentiating means, and misfire-determining means.

Figure 27:
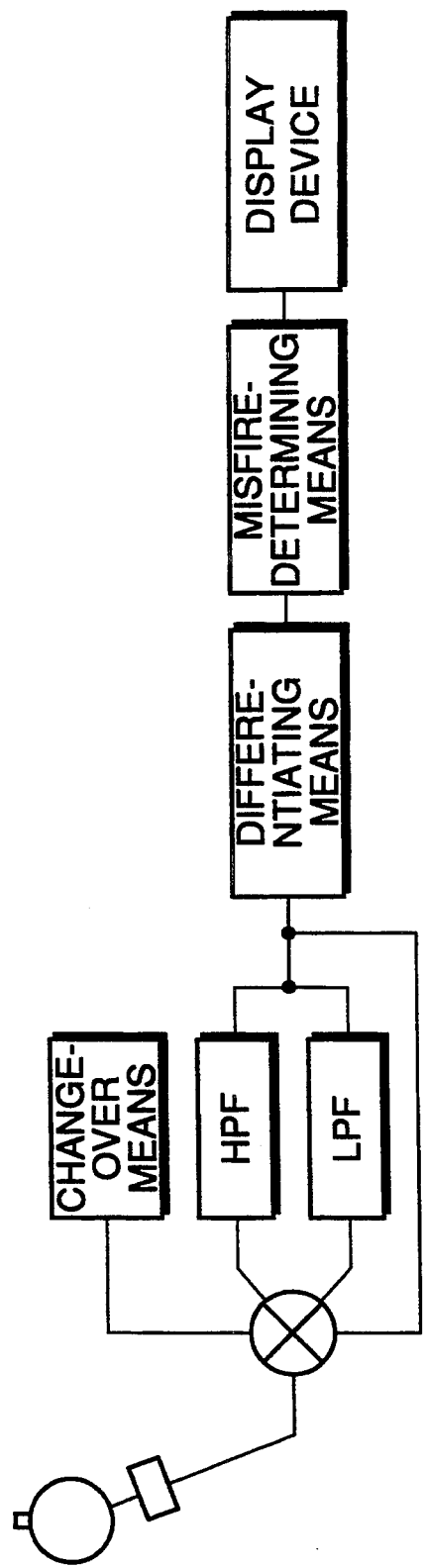
FIG. 27 is a view schematically showing the arrangement of means formed by a CPU according to the fifth embodiment.

FIG. 27 schematically shows the arrangement of these means of the present embodiment.

The manner of detecting a misfire will now be described in detail.

Figure 15:
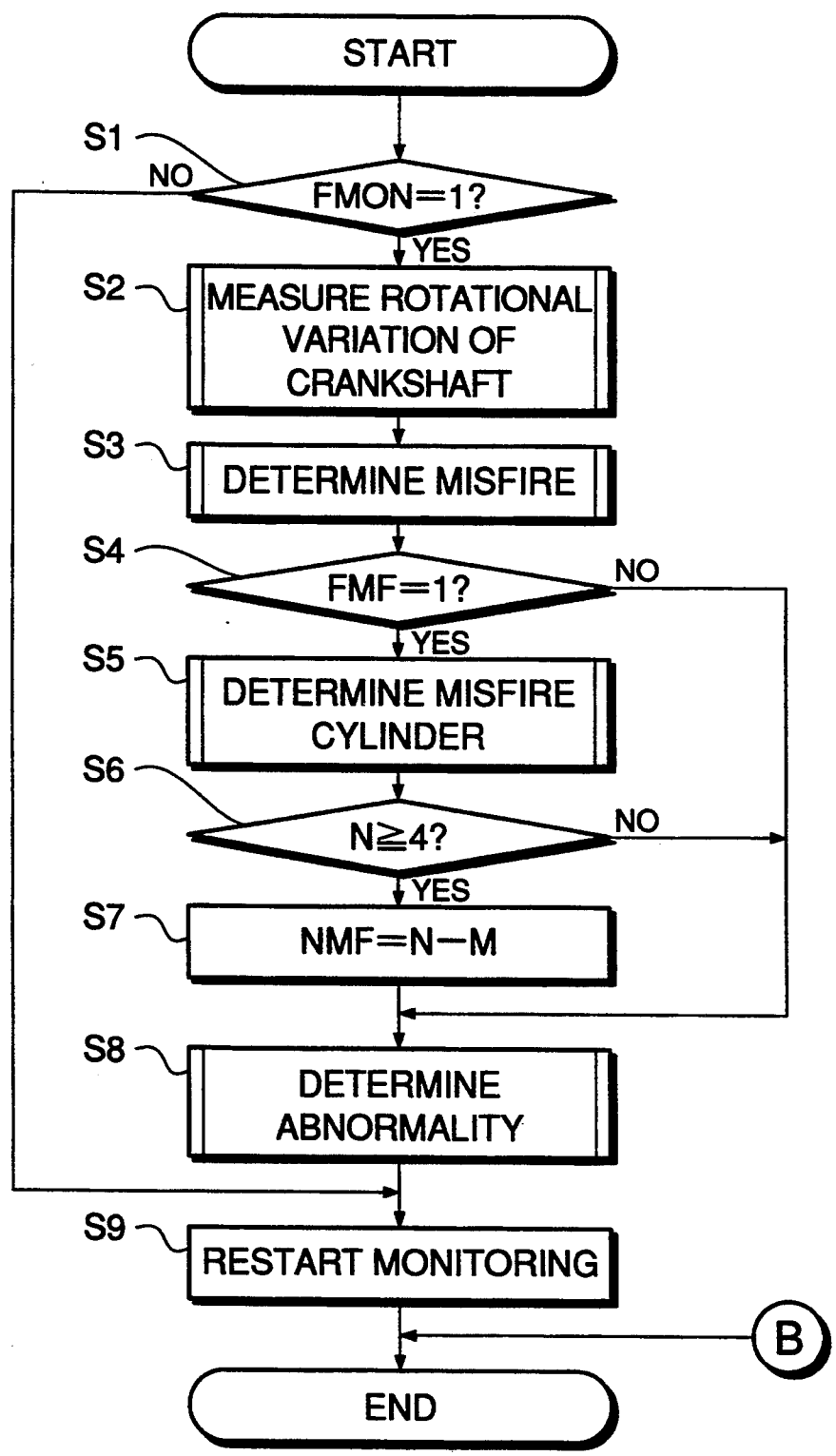
FIG. 15 is a flowchart showing a manner of detecting a misfire according to the fifth embodiment.

FIG. 15 shows a program of detecting a misfire, as a main routine, which is carried out by the CPU 35. This program is executed in synchronism with generation of each TDC signal pulses.

First, at a step S1, it is determined whether or not a flag FMON has been set to "1" by a routine for determining whether to permit monitoring described in detail hereinafter. If the answer to this question is negative (NO), the program jumps to a step S9 where the routine for determining whether to permit monitoring is started again, followed by terminating the program. On the other hand, if the answer to the question of the step S1 is affirmative (YES), the program proceeds to a step S2, where a variation in the rotational speed of the crankshaft (a variation in the repetition period of occurrence of CRK signal pulses) is measured, and then a routine for determining a misfire is carried out. At the following step S4, it is determined whether or not a flag FMF indicative of detection of a misfire has been set to "1". In short, it is determined based on the measured variation in the rotational speed of the crankshaft whether or not a misfire has occurred in a cylinder. If the answer to this question is negative (NO), the program jumps to a step S8, whereas if it is affirmative (YES), i.e. in a case where any of the cylinders have been determined to suffer from a misfire, the program proceeds to a step S5 where a routine for determining a cylinder in which the misfire has occurred is carried out.

Then, the program proceeds to a step S6, where it is determined whether or not the number N of continual detections of misfires is equal to or larger than a predetermined number. That is, in a case where misfires have continually occurred in cylinders, each misfire occurring cylinder is determined whenever a TDC signal pulse for the cylinder is generated, and then the number of detections of continually-occurring misfires in the cylinder is calculated. The predetermined number is set to such a value as can determine that misfires have occurred in the cylinders even when fuel cut is effected or when the engine is stopped, e.g. 4 in the case of a four cylinder type engine.

If the answer to the question of the step S6 is affirmative (YES), it is determined that probably fuel cut is being effected or the engine is stopped, and then a misfire-occurring time number NMF is obtained by subtracting the predetermined time number M from the number N of continual detections of misfires, whereby the misfires corresponding to the predetermined time number M are not deemed to be effective misfires. Then, the program proceeds to the step S8 to effect a determination of abnormality of the engine, and the monitoring permission-determining routine is restarted at the step S10, followed by terminating the program.

Next, the above-mentioned monitoring permission-determining routine and other processing steps (subroutines) in FIG. 15 will be described.

(1) Determination as to permission of monitoring

Figure 16:
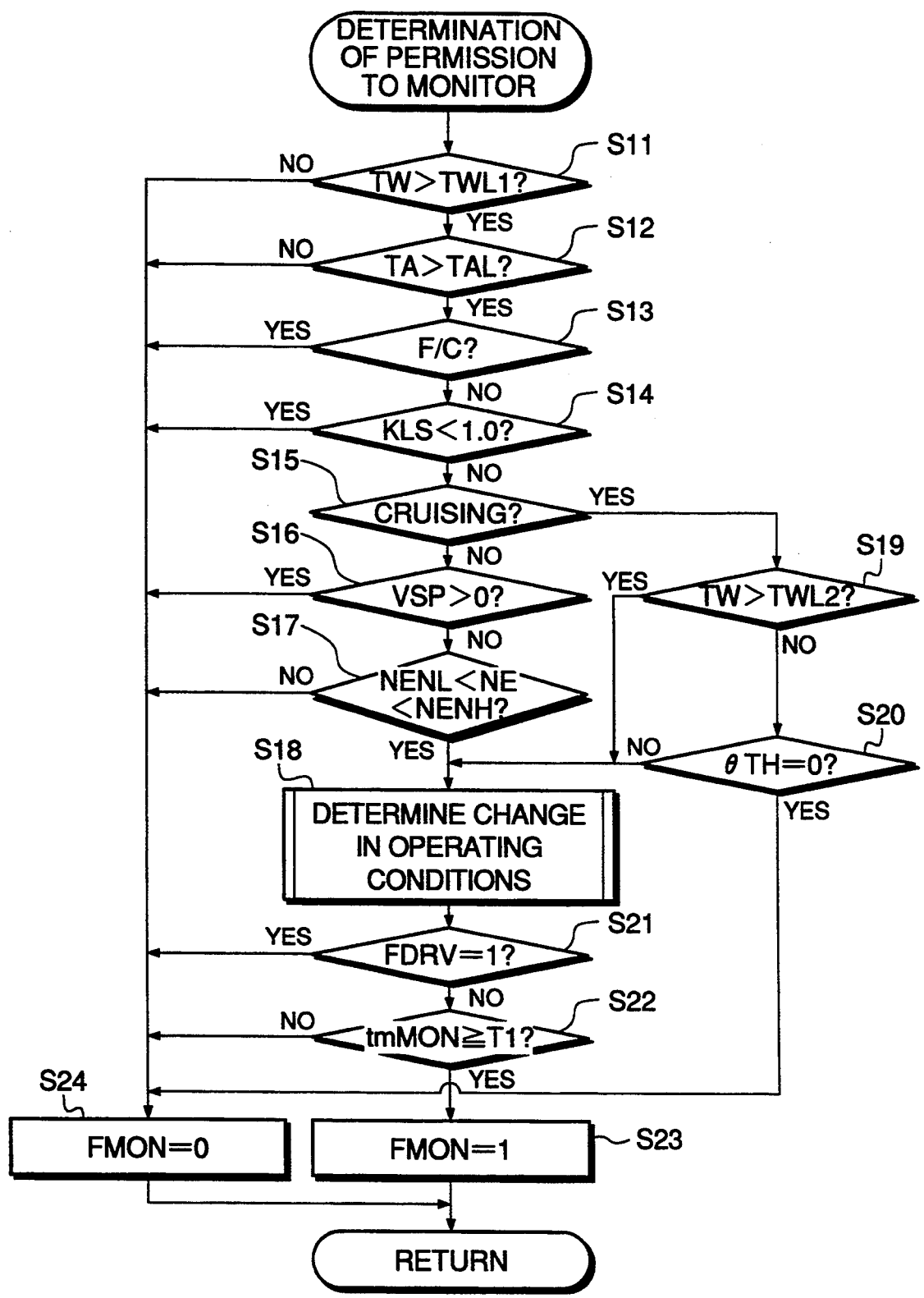
FIG. 16 is a flowchart of a manner of determining whether to permit monitoring.

FIG. 16 shows the subroutine for determining whether to permit monitoring, which is carried out as background processing.

First, it is determined at a step S11 whether or not the engine coolant temperature TW (detected by the TW sensor 40) is higher than a first predetermined value TWL1 (e.g. 0° C.). If the answer to this question is affirmative (YES), it is determined at a step S12 whether or not the intake air temperature (detected by the TA sensor 9) is higher than a predetermined value TAL (e.g. 0° C.). If either of the answers to the questions of the steps S11 and S12 is negative (NO), it is determined that the engine is in stoppage or has just been started, and then the program proceeds to a step S24, where the flag FMON is set to "0", followed by terminating the program.

On the other hand, if both of the answers to the questions of the steps S11 and S12 are affirmative (YES), the program proceeds to a step S13, where it is determined whether or not the engine 1 is under fuel cut. Whether or not the engine is under fuel cut is determined based on the engine rotational speed NE and the throttle valve opening $\theta$TH, and more particularly by execution of a routine for determining fuel cut, not shown.

If the answer to the question of the step S13 is affirmative (YES), i.e. if the engine is under fuel cut, the program proceeds to the step S24 to set the flag FMON to "0" since it is then unnecessary to monitor detection of a misfire. If the answer to this question is negative (NO), it is determined at a step S14 whether or not the leaning correction coefficient KLS is smaller than "1.0". If the answer to this question is affirmative (YES), i.e. if KLS<1.0, which means that roughness of engine rotation is so large that irregular combustion is liable to occur, the program proceeds to the step S24 to set the flag FMON to "0", followed by terminating the program. If the answer to the question of the step S14 is negative (NO), it is determined at a step S15 whether or not the vehicle is cruising. This determination is carried out e.g. by determining whether or not the the variation in the vehicle speed continues to be within ±0.8 km/sec over 2 seconds. If the answer to this question is negative (NO), it is determined at a step S16 whether or not the vehicle speed VSP (detected by the vehicle speed sensor 49) is higher than "0". If the answer to this question is affirmative (YES), which means that the vehicle is accelerating or decelerating, the flag FMON is set to "0" at the step S24, followed by terminating the program. On the other hand, if the answer to the question of the step S16 is negative (NO), which means that the engine is in no load condition, it is determined at a step S17 whether or not the engine rotational speed NE is within a predetermined range (NENL<NE<NENH), e.g. whether or not 750 rpm<NE<3000 rpm holds. If the answer to this question is negative (NO), the flag FMON is set to "0" at the step S24, followed by terminating the program. If the answer to this question is affirmative, the program proceeds to a step S18.

On the other hand, if the answer to the question of the step S15 is affirmative (YES), i.e. if the vehicle is cruising, it is determined at a step S19 whether or not the engine coolant temperature TW is higher than a second predetermined value TWL2. The second predetermined value TWL2 is set to such a value at which there can occur irregular combustion due to roughness of rotation of the crankshaft immediately after the start of the engine, e.g. to 20° C. Then, if the answer to the question of the step S19 affirmative (YES), it is determined that irregular combustion cannot occur, so that the program proceeds to the step S18. If the answer to the question of the step S19 is negative (NO), it is determined at a step S20 whether or not the throttle valve opening $\theta$TH (detected by the $\theta$TH sensor 34) is the minimum, i.e. the throttle valve is fully closed. If the answer to this question is affirmative (YES), the program proceeds to the step S24 to set the flag FMON to "0", followed by terminating the program.

If the answer to the question of the step S20 is negative (NO), i.e. if the throttle valve opening $\theta$TH does not assume the minimum value, it is determined that irregular combustion cannot occur, and then the program proceeds to the step S18. In short, when the engine is under no load condition or when the engine is cruising without possibility of occurrence of roughness of rotation of the crankshaft, the program proceeds to the step S18, where it is determined whether or not the operating condition of the engine has been changed.

Figure 17:
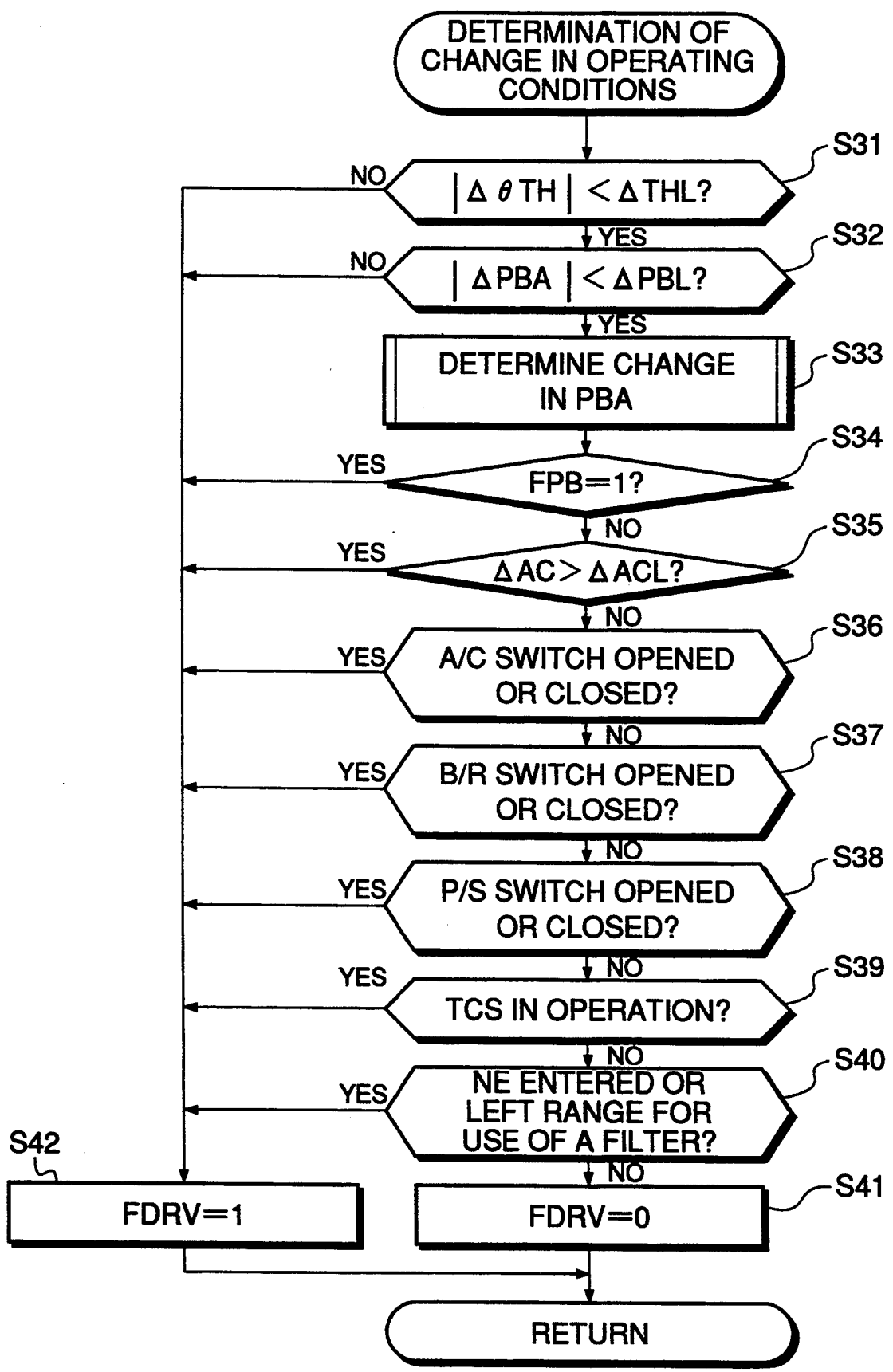
FIG. 17 is a flowchart of a manner of determining changes in the operating condition of the engine.

This determination of change in the operating condition of the engine is carried out according to a subroutine shown in FIG. 17. This program is also executed by background processing, similarly to the routine of FIG. 16.

First, at a step S31, it is determined whether or not the absolute value of the difference $\Delta\theta$TH in the throttle valve opening $\theta$TH between the immediately preceding TDC signal pulse and the present TDC signal pulse is smaller than a predetermined value (e.g. 2° C.). If the answer to this question is affirmative (YES), the program proceeds to a step S32, where it is determined whether or not the absolute value of the difference ΔPBA in the intake pipe absolute pressure PBA between the immediately preceding TDC signal pulse and the present TDC signal pulse is smaller than a predetermined value (e.g. 10 mmHg). That is, at the steps S31 and S32, it is determined whether or not a slight change in the engine operating condition which is undetectable by the vehicle speed sensor 49 has occurred. If at least one of the answers to the questions of the steps S31 and S32 is negative (NO), it is determined that the operating condition of the engine has changed, so that a flag FDRV is set to "1", followed by returning to the routine shown in FIG. 16.

On the other hand, if both of the answers to the questions of the steps S31 and S32 are affirmative (YES), the program proceeds to a step S33, where it is determined whether or not the intake pipe absolute pressure PBA has changed over a time period longer than the time interval of two adjacent TDC signal pulses. That is, there can be a case in which although each variation in the intake pipe absolute pressure PBA detected from every two PBA values detected at adjacent TDC signal pulses is small, but the intake pipe absolute pressure PBA has changed largely over a time period longer than the time interval of TDC signal pulses, e.g. 100 ms, and therefore at the step S33, it is determined whether or not such variation in PBA over a time period longer than the TDC signal pulse interval is larger than a predetermined value. In other words, for example, when the clutch is half engaged in the case of the transmission 47 being a manual type (MT), or a shift change is effected in the case of the transmission being an automatic type (AT), the variation in the intake pipe absolute pressure PBA progressively becomes large. Therefore, in the present embodiment, a variation in the intake pipe absolute pressure PBA is detected over each predetermined time period set to a value longer than the TDC signal pulse interval to thereby determine whether or not the intake pipe absolute pressure PBA has changed largely, in order to avoid erroneous detection of a misfire when the manual transmission is half engaged or when the automatic transmission has undergone a shift change.

Figure 18:
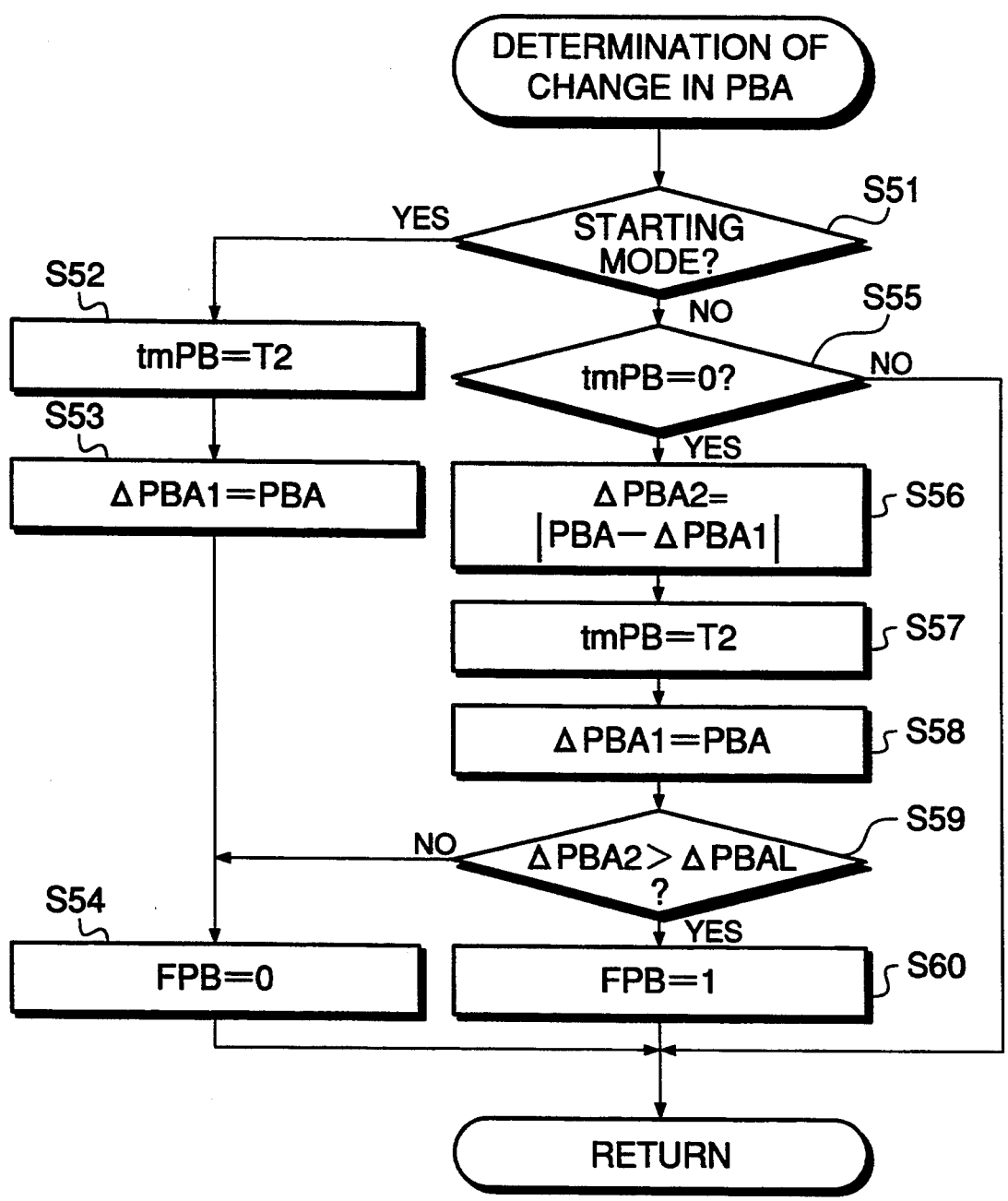
FIG. 18 is a flowchart of a manner of determining a change in the intake pipe absolute pressure.

Whether the intake pipe absolute pressure PBA has changed or not is determined by carrying out a routine for determining PBA change shown in FIG. 18. This program is executed in synchronism with generation of false signal pulses by a timer provided in the ECU 5 whenever a predetermine time period, e.g. 10 ms, elapses.

First, at a step S51, it is determined whether or not the engine is in the starting mode. This determination is carried out by determining whether or not a starter switch, not shown, of the engine is closed, and at the same time the engine rotational speed NE is lower than a predetermined value (cranking engine rotational speed).

If the answer to the question of the step S51 is affirmative (YES), a timer tmPB is set to a predetermined time period T2 (e.g. 100 ms) and started at a step S52, then an amount of change ΔPBA1 in the intake pipe absolute pressure is set to a value of PBA detected in the present loop at a step S53, and a flag FPB is set to "0" at a step S54, followed by terminating the program.

On the other hand, if the answer to the question of the step S51 becomes negative (NO) in a subsequent loop, the program proceeds to a step S55, where it is determined whether or not the second predetermined time period T2 set by the timer tmPB has been counted up.

If the answer to this question is negative (NO), the program is immediately terminated, whereas if the answer is affirmative (YES), the value ΔPBA1 is subtracted from the a value of PBA detected in the present loop, i.e. the present PBA value, and the absolute value of this difference is set to an amount of change ΔPBA2 in the intake pipe absolute pressure at a step S56, and then the timer tmPB is set to the predetermined time period T2 (e.g. 100 ms) again at a step S57 for measuring the amount of change in PBA in the following loop. Thereafter, similarly to the step S53, the amount of change ΔPBA1 is set to the present PBA valve at a step S58, and then it is determined at a step S59 whether or not the amount of change ΔPBA2 calculated at the step S56 is larger than a predetermined lower limit value JPBAL (e.g. 40 mmHg).

If the answer to this question is negative (NO), the flag FPB is set to "0", followed by terminating the program, whereas if the answer is affirmative (YES), it is determined that the intake pipe absolute pressure PBA has changed largely, so that the flag FPB is set to "1" at a step S60, followed by returning to the routine in FIG. 17.

Thus, after executing the determination of PBA change (at the step S33 in FIG. 17), the program proceeds to a step S34 in FIG. 17, where it is determined whether or not the flag FPB has been set to "1" in the above described routine for determining PBA change. If the answer to this question is affirmative (YES), it is determined that the operating condition of the engine has changed, so that the flag FDRV is set to "1", followed by returning to the routine shown in FIG. 16.

If the answer to the question of the step S34 in FIG. 17 is negative (NO), the program proceeds to a step S35, where it is determined whether or not an amount of change ΔAC in load of electric devices 53 is larger than a predetermined value ΔACL (e.g. 0.8 A). If the answer to this question is negative (NO), it is determined at a step S36 whether or not the air conditioner switch 50 has been closed or opened. If the answer to this question is negative (NO), it is determined at a step S37 whether or not the brake light switch 51 has been closed or opened. If the answer to this question is negative (NO), it is determined at a step S38 whether or not the power steering switch 52 has been closed or opened. If the answer to this question is negative (NO), it is determined at a step S39 whether or not the TCS has operated due to an excessive slip of the driving wheel(s).

If the answer to this question is negative (NO), it is determined at a step S40 whether or not the state of use of filters has changed. As will be described in detail hereinbelow, in the present embodiment, in processing the rotational speed signal, a high-pass filter is used to eliminate low frequency noise components therefrom when the engine rotational speed is low, while a low-pass filter is used to eliminate high frequency noise components therefrom when the engine rotational speed is high. When the engine rotational speed NE is in the boundary region for changing the use of the filters, i.e. at or near a value of 3000 rpm for the high-pass filter, and at or near a value of 5000 rpm for the low-pass filter, the state of use of the filters can change, which may result in a change in the output value from the signal processing means indicative of the rotational speed of the crankshaft. Therefore, in the present embodiment, it is determined whether or not the state of use of the filters has changed. If the answer to the question of the step S40 is negative (NO), the flag FDRV is set to "0" at a step S41, followed by returning to the routine in FIG. 16. In short, if all the answers to the steps of S34 to S40 are negative (NO), it is determined that the operating condition of the engine has not changed, so that the flag FDRV is set to "0", followed by returning to the routine in FIG. 16.

On the other hand, if any of the answers to the questions of the steps S34 to S40 is affirmative (YES), it is determined that the operating condition of the engine has changed, so that the flag FDRV is set to "1" at the step S42, followed by returning to the routine in FIG. 16.

Thus, after executing the subroutine of determining a change in the operating condition of the engine (at the step S18 in FIG. 16), the program proceeds to a step S21, where it is determined whether or not the flag FDRV is set to "1". If the answer to this question is affirmative (YES), the flag FMON is set to "0" at the step S24, followed by terminating the program, whereas if the answer is negative (NO), it is determined at a step S22 whether or not a timer tmMON has measured the lapse of a predetermined time period T1. If the answer to this question is negative (NO), the program proceeds to the step S24, where the flag FMON is set to "0", whereas if the answer is affirmative (YES), the flag is set to "1" at a step S23 to permit monitoring detection of a misfire, followed by terminating the program.

(2) Measuring a variation in the rotational speed of the crankshaft (the step S2 in FIG. 15)

Figure 19:
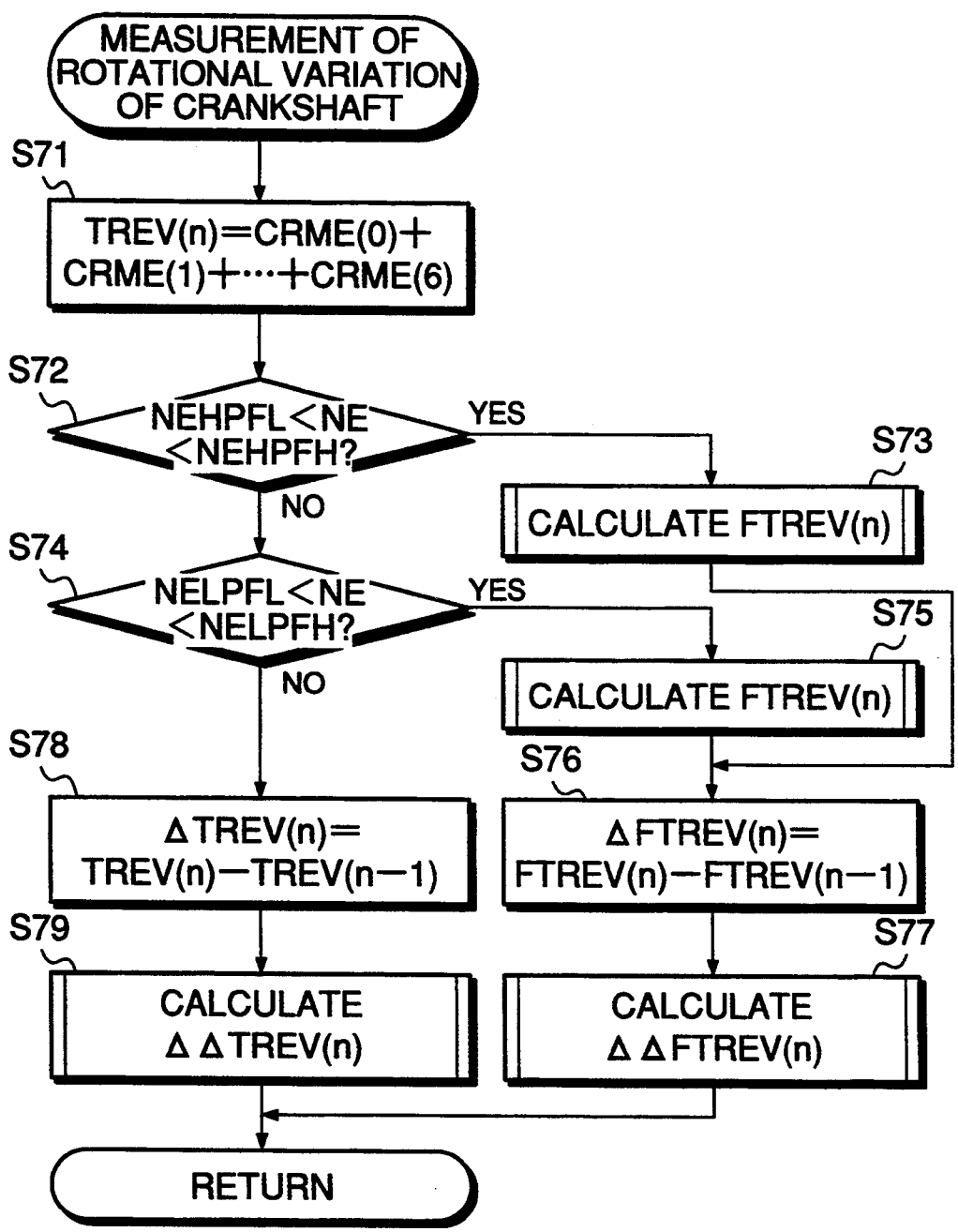
FIG. 19 is a flowchart of a manner of measuring variation in the rotational speed of the crankshaft.

FIG. 19 shows a subroutine for measuring a variation in the rotational speed of the crankshaft, which is executed in synchronism with generation of TDC signal pulses.

First, at a step S71, the sum of values of the time interval CRME between each two adjacent CRK signal pulses from #0 stage to #6 stage is calculated to obtain a time interval TREV(n) by the use of the following formula (3):

$$TREV(n) = CRME(0) + CRME(1) + \ldots + CRME(6) \quad (3)$$

In this connection, the ME value for calculating the engine rotational speed NE is obtained by calculating the sum of CRME values of #0 stage to #5 stage, i.e. over a rotational angle of 180°, as described hereinbefore. However, the time interval TREV(n) for determining a variation in the rotational speed of the crankshaft is obtained by calculating the sum of CRME values of #0 to #6 stage, i.e. over a rotational angle of 210°, taking into account the influence of a misfire on the rotational speed.

Then, at a step S72, it is determined whether or not the engine rotational speed NE is in a region for use of the high-pass filter, i.e. whether or not the engine rotational speed NE is within a range between a lower limit value NEHPFL and an upper limit value NEHPFH. The lower limit value NEHPFL is set to a value close to the idling rotational speed of the engine, e.g. 750 rpm, while the upper limit value NEHPFH is set to a value below which low frequency components produced by "the reactionary motion" of the vehicle body following a misfire can be positively blocked or attenuated, e.g. 3000 rpm.

If the answer to the question of the step S72 is affirmative (YES), a filter output value FTREV(n) of the high-pass filter is calculated by the following formula (4):

$$FTREV(n) = b_1 TREV(n) + b_2 TREV(n-1) + b_3 TREV(n-2) - a_1 FTREV(n-1) - a_2 FRTEV(n-2) \quad (4)$$

where $b_1$, $b_2$, $b_3$, $a_1$, and $a_2$ are filter transfer coefficients set to respective predetermined values for the high-pass filter, e.g. $b_1 = 0.2096$, $b_2 = 0.4192$, $b_3 = 0.2096$, $a_1 = 0.3557$, and $a_2 = 0.194$.

Further, as initial values, a time interval TREV(O) in the loop immediately before the immediately preceding loop is used for the filter output value FTREV(O) in the loop immediately before the immediately preceding loop, by the following formula (5), while a time interval TREV(1) in the immediately preceding loop is used for the filter output value FTREV(1) in the immediately preceding loop, by the following formula (6).

$$FTREV(0) = TREV(0) \quad (5)$$

$$FTREV(1) = TREV(1) \quad (6)$$

On the other hand, if the answer to the question of the step S72 is negative (NO), the program proceeds to a step S74, where it is determined whether or not the engine rotational speed NE is in a region for use of the low-pass filter, i.e. whether or not the engine rotational speed NE is within a range between a lower limit value NELPFL and an upper limit value NELPFH. The lower limit value NELPFL is set to a value above which high frequency noise components caused by vibrations due to torsion of the crankshaft or "shaky movement" of journals can be positively blocked or attenuated, e.g. 5000 rpm, while the upper limit value NELPFH is set to the maximum value that can be achieved by the engine 31, e.g. 6500 rpm. If the answer to the question of the step S74 is affirmative (YES), the program proceeds to a step S75, where a filter output value FTREV(n) of the low-pass filter is calculated by the following formula (7):

$$FTREV(n) = b_1' TREV(n) + b_2' TREV(n-1) + b_1' TREV(n-2) - a_1' FTREV(n-1) - a_2' FTREV(n-2) \quad (7)$$

where $b_1'$, $b_2'$, $b_3'$, $a_1'$, and $a_2'$ are filter transfer coefficients set to respective predetermined values for the low-pass filter, e.g. $b_1' = 0.0159$, $b_2' = 0.0318$, $b_3' = 0.0159$, $a_1' = 1.613$, and $a_2' = 0.6766$.

Further, as initial values, a time interval TREV(O) in the loop immediately before the immediately preceding loop and a time interval TREV(1) in the immediately preceding loop are used for the filter output value FTREV(O) in the loop immediately before the immediately preceding loop and the filter output value FTREV(1) in the immediately preceding loop, respectively, similarly to the formulas (5) and (6).

Then, at a step S76, the difference $\Delta FTREV(n)$ between the FTREV(n) value in the present loop and the FTREV(n-1) in the immediately preceding loop is calculated by the use of the following formula (8):

$$\Delta FTREV(n) = FTREV(n) - FTREV(n-1) \quad (8)$$

Then, at a step S77, a rotational variation amount $\Delta\Delta FTREV(n)$ during use of the filters fis calculated by the use of the following formula (9):

$$\Delta\Delta FTREV(n) = \Delta FTREV(n) - [\Delta F\text{-}TREV(n-1) + \Delta FTREV(n-2) + F\text{-}TREV(n-3)]/3 \quad (9)$$

The rotational variation amount $\Delta\Delta FTREV(n)$ is calculated as a difference between the present value of $\Delta\Delta FTREV(n)$ and an average value of immediately preceding values of same in order to detect variation in the rotational speed more distinctly and reliably, similarly to the fourth embodiment described hereinbefore.

On the other hand, if the answer to the question of the step S74 is negative (NO), i.e. in a case where the engine rotational speed NE is in a medium region (e.g. 3000 to 5000 rpm) in which no filter is used, the difference $\Delta TREV(n)$ between the time interval $TREV(n)$ in the present loop and the time interval $TREV(n-1)$ in the immediately preceding loop is calculated by the use of the following formula (10):

$$\Delta TREV(n) = TREV(n) - TREV(n-1) \quad (10)$$

Then, at a step S79, a rotational variation amount $\Delta\Delta TREV(n)$ is calculated by the use of the following formula (11) similar to the formula (9), by taking into account three preceding $\Delta TREV$ values:

$$\Delta\Delta TREV(n) = \Delta TREV(n) - [\Delta TREV(n-1) + \Delta TREV(n-2) + \Delta TREV(n-3)]/3 \quad (11)$$

Determination of a misfire (the step S3 in FIG. 15)

Figure 20:
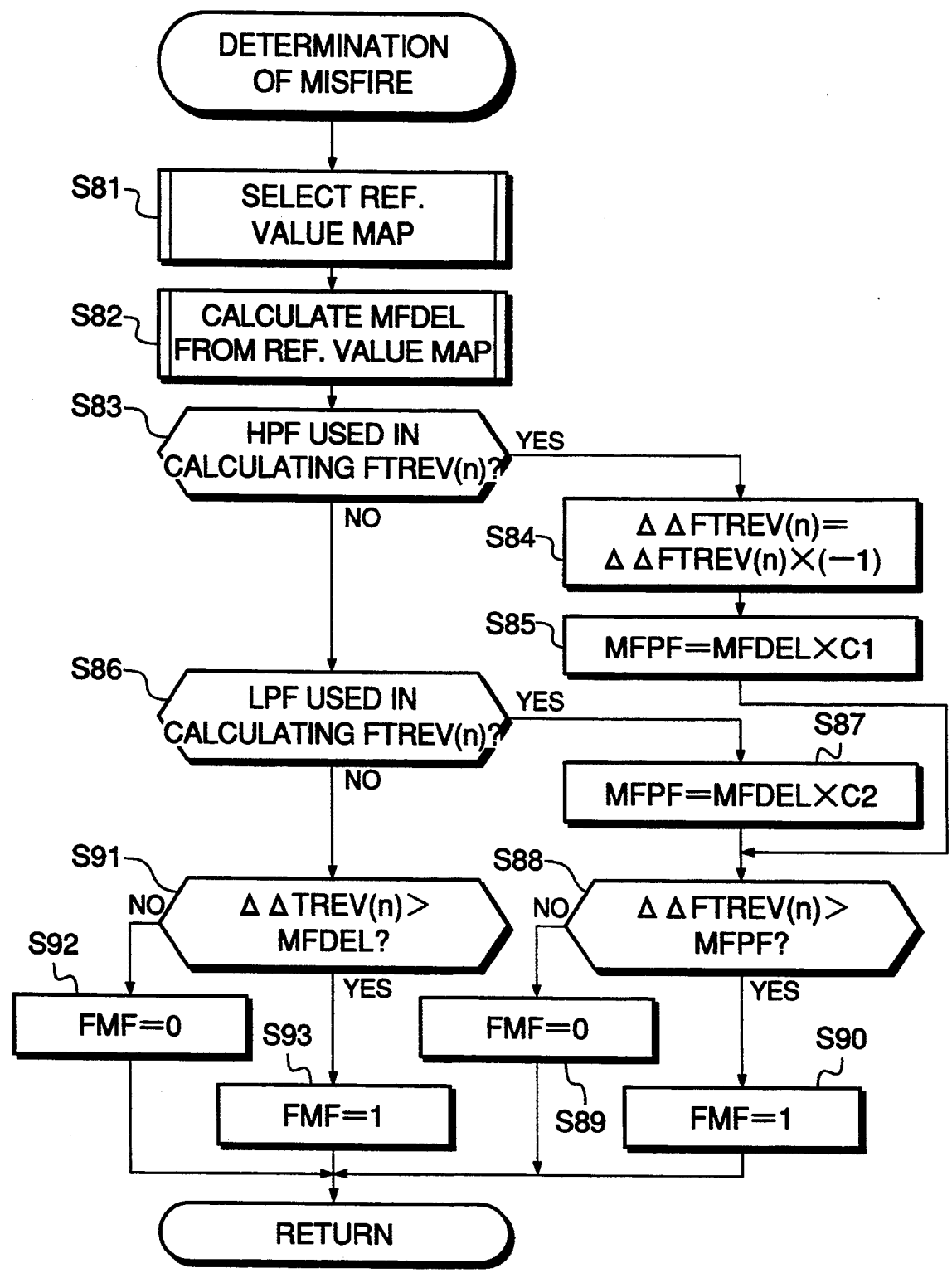
FIG. 20 is a flowchart of a manner of determining a misfire.

FIG. 20 shows a subroutine for determining a misfire, which is executed in synchronism with generation of TDC signal pulses.

First, at a step S81, a misfire-determining reference value map is selected depending on the type of the transmission 47 and the state of engagement of the clutch.

As is well known, the automatic transmission (AT) incorporates a torque converter for changing the torque of the engine, which makes variation in the rotational speed of the crankshaft less liable to occur than the manual transmission (AT), and hence the variation in the rotational speed caused by a misfire is smaller in an engine connected to the AT than in an engine connected to the MT. Therefore, if the same misfire-determining reference value map is used for both the AT-connected engine and the MT-connected engine, this may cause an erroneous misfire determination. For example, if a misfire-determining reference value map suitable for an MT-connected engine is used for an AT-connected engine, the reference value for determining a misfire is set to a value larger than a proper value, which may lead to an erroneous determination that no misfire has occurred even when a misfire has actually occurred, while if a misfire-determining reference value map suitable for an AT-connected engine is used for an MT-connected engine, the reference value for determining a misfire is set to a value smaller than a proper value, which may lead to an erroneous determination that a misfire has occurred even when no misfire has actually occurred. In short, the misfire-determining reference value is required to be set to a smaller value for an AT-connected engine than for an MT-connected engine.

Further, as to the state of engagement of the clutch, the variation in the rotational speed of the crankshaft is more liable to occur when the clutch is engaged than when the clutch is disengaged. Therefore, if the same misfire-determining reference value is used irrespective of the state of engagement of the clutch, this may cause an erroneous misfire determination. For example, if the clutch is engaged, the reference value for determining a misfire may be set to a value smaller than a proper value, which may lead to an erroneous determination that a misfire has occurred even when no misfire has actually occurred, while if the clutch is disengaged, the reference value for determining a misfire may be set to a value larger than a proper value, which may lead to an erroneous determination that no misfire has occurred even when a misfire has actually occurred, thus preventing an accurate misfire detection in both cases. Therefore, in the present embodiment, a different misfire-determining reference value map is selected depending on the type of the transmission 47 and the state of engagement of the clutch.

Figure 21:
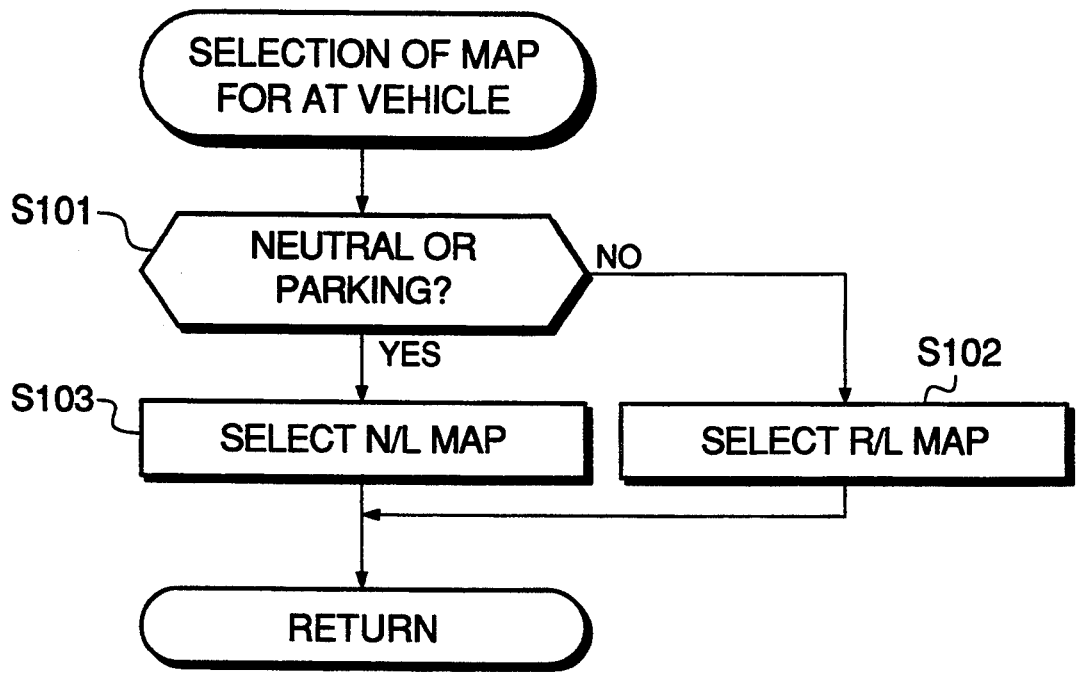
FIG. 21 is a flowchart of a manner of selecting a map of reference values for determining a misfire occurring in an AT vehicle.

More specifically, if the transmission is the AT type, a map-selecting routine for an AT vehicle shown in FIG. 21 is executed to select a no load (N/L) map for an AT vehicle or a road load (R/L) map for the AT vehicle.

That is, it is determined at a step S101 whether or not the transmission 47 is a neutral range or a parking range. If the answer to this question is negative (NO), the R/L map is selected at a step S102, whereas if the answer is affirmative (YES), the N/R map is selected at a step S103, followed by returning to the routine in FIG. 20.

Figure 22:
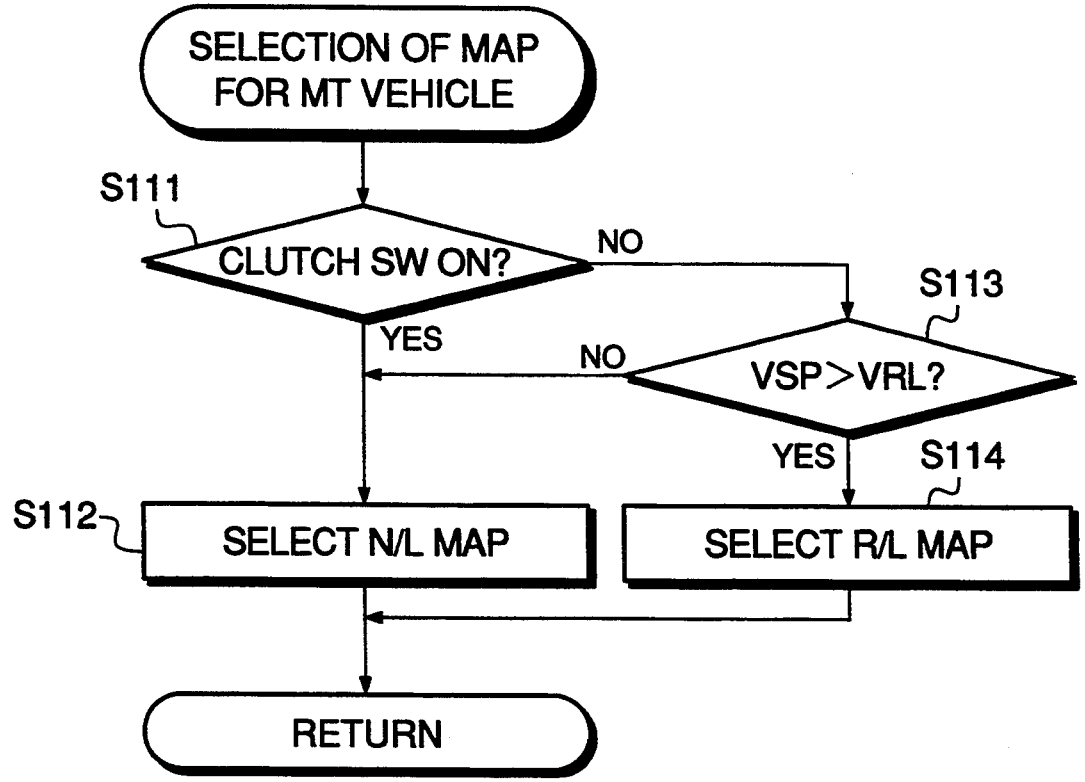
FIG. 22 is a flowchart of a manner of selecting a map of reference values for determining a misfire occurring in an MT vehicle.
Figure 23:
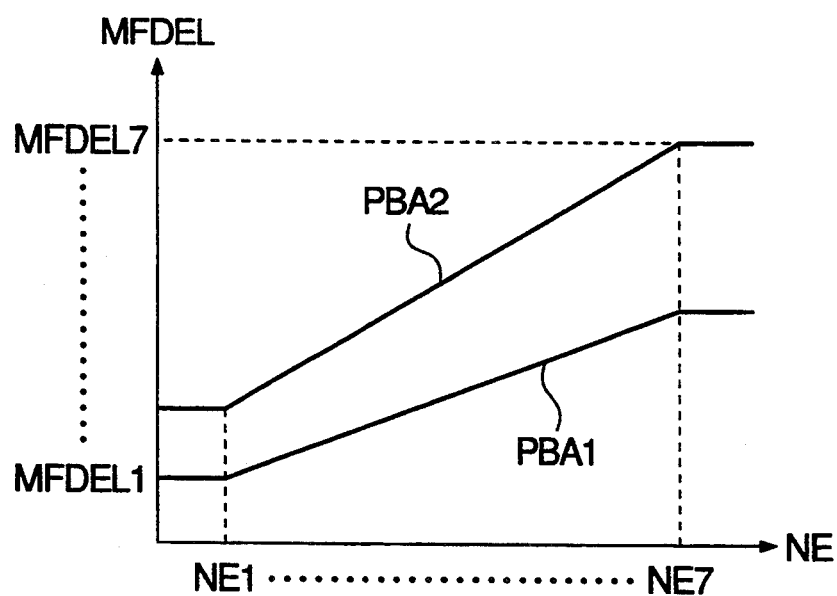
FIG. 23 is a view showing a map of MFDEL.

If the transmission is the MT type, a map-selecting routine for an MT vehicle shown in FIG. 22 is executed to select an N/L map for an MT vehicle or an R/L map for the MT vehicle.

That is, it is determined at a step S111 whether or not the clutch switch is closed. If the answer to this question is affirmative (YES), the N/L map is selected at a step S112, followed by returning to the routine in FIG. 20.

On the other hand, if the answer to the question of the step S111 is negative (NO), it is determined at a step S113 whether or not the vehicle speed VSP is higher than a predetermined value VRL (e.g. 5 km/h). If the answer to this question is negative (NO), it is determined that the vehicle is in a neutral position, and the N/L map is selected at a step S112, followed by returning to the routine in FIG. 20.

On the other hand, if the answer to the question of the step S113 is affirmative (YES), the R/L map is selected at a step S114, followed by returning to the routine in FIG. 20.

Thus, after the misfire-determining reference value map is selected at the step S81 in FIG. 20, the program proceeds to a step S82 in FIG. 20, where a misfire-determining reference value MFDEL is retrieved from the selected misfire-determining reference value map.

The misfire-determining reference value map contains MFDEL values of MFDEL1 to MFDEL7 corresponding to NE values of NE1 to NE7 and PBA values of PBA, PBA2. A value of the misfiredetermining reference value is read from this map or by carrying out interpolation. More specifically, the memory means 35c stores, four kinds of maps from which the misfire-determining reference value is obtained, i.e. the N/L map for the AT vehicle, the R/L map for the AT vehicle, the N/L map for the MT vehicle, and the R/L map for the MT vehicle, and from one of the map selected by the routine in FIG. 21 or FIG. 22, the misfire-determining reference value MFDEL is calculated. In addition, for the same values of the engine rotational speed NE and the intake pipe absolute pressure PBA, the MFDEL values in the maps for the MT vehicle are set to larger values than for those in the maps for the AT vehicle for the reason described above, and the MFDEL values in the R/L maps are set to larger values than those in the N/L maps.

Then, the program proceeds to a step S83, where it is determined whether or not the high-pass filter was used in measuring the variation in the rotational speed of the crankshaft. If the answer to this question is affirmative (YES), the rotational variation amount $\Delta\Delta FTREV(n)$ during use of the high-pass filter calculated at the step S77 (in FIG. 19) multiplied by "$-1$" to invert the sign of the value, and the resulting value is set to a new rotational variation amount $\Delta\Delta TREV(n)$. This enables to solve the problem of a shift in phase between the use of the high-pass filter and the use of the low-pass filter, which is convenient to determination of a misfire-occurring cylinder, described hereinafter.

That is, in determining a misfire-occurring cylinder in which a misfire has occurred, there arises a shift of 180° in phase between the use of the high-pass filter and the use of the low-pass filter. Accordingly, the sign of the rotational variation amount $\Delta\Delta FTREV(n)$ during use of the high-pass filter is inverted to cancel the shift.

Then, the misfire-determining reference value MFDEL is multiplied by a first correction coefficient C1 (e.g. 0.5) to calculate a corrected reference value MFPF at a step S85, followed by the program proceeding to a step S88.

On the other hand, if the answer to the question of the step S83 is negative (NO), it is determined at a step S86 whether or not the low-pass filter was used in determining the variation in the rotational speed of the crankshaft. If the answer to this question is affirmative (YES), the misfire-determining reference value MFDEL is multiplied by a second correction coefficient C2 (e.g. 0.6) to calculate the corrected reference value MFPF at a step S87, followed by the program proceeding to the step S88. That is, the rotational variation amount $\Delta\Delta FTREV(n)$ calculated during use of the filters assumes a smaller value than the rotational variation amount $\Delta\Delta TREV(n)$ calculated when no filter is used, and hence the former value shows a smaller difference from the misfire-determining value MFDEL as set only by retrieval from the map, which may lead to an erroneous misfire determination. Therefore, the misfire-determining reference value is multiplied by the first or second correction coefficient C1 or C2, to calculate the corrected reference value MFPF so as to ensure positive detection of a misfire.

Then, at the step S88, it is determined whether or not the rotational variation amount $\Delta\Delta FTREV(n)$ during use of one of the filters is larger than the corrected reference value MFPF. If the answer to this question is negative (NO), it is determined that no has misfire occurred, so that a flag FMF is set to "0" at a step S89, followed by terminating the program.

If the answer to the question of the step S88 is affirmative (YES), it is determined that a misfire has occurred, so that the flag FMF is set to "1", followed by terminating the routine.

If the answer to the question of the step S86 is negative (NO), i.e. if no filter was used in measuring the variation in the rotational speed of the crankshaft, the program proceeds to a step S91, where it is determined whether or not the rotational variation amount $\Delta\Delta TREV(n)$ is larger than the misfire-determining reference value. If the answer to this question is negative (NO), the flag FMF is set to "0" at a step S92, whereas if the answer is affirmative (YES), it is determined that a misfire has occurred in the engine, so that the flag FMF is set to "1" at a step S93, followed by terminating the routine.

(4) Determination of a misfire-occurring cylinder (the step S5 in FIG. 15)

Figure 24:
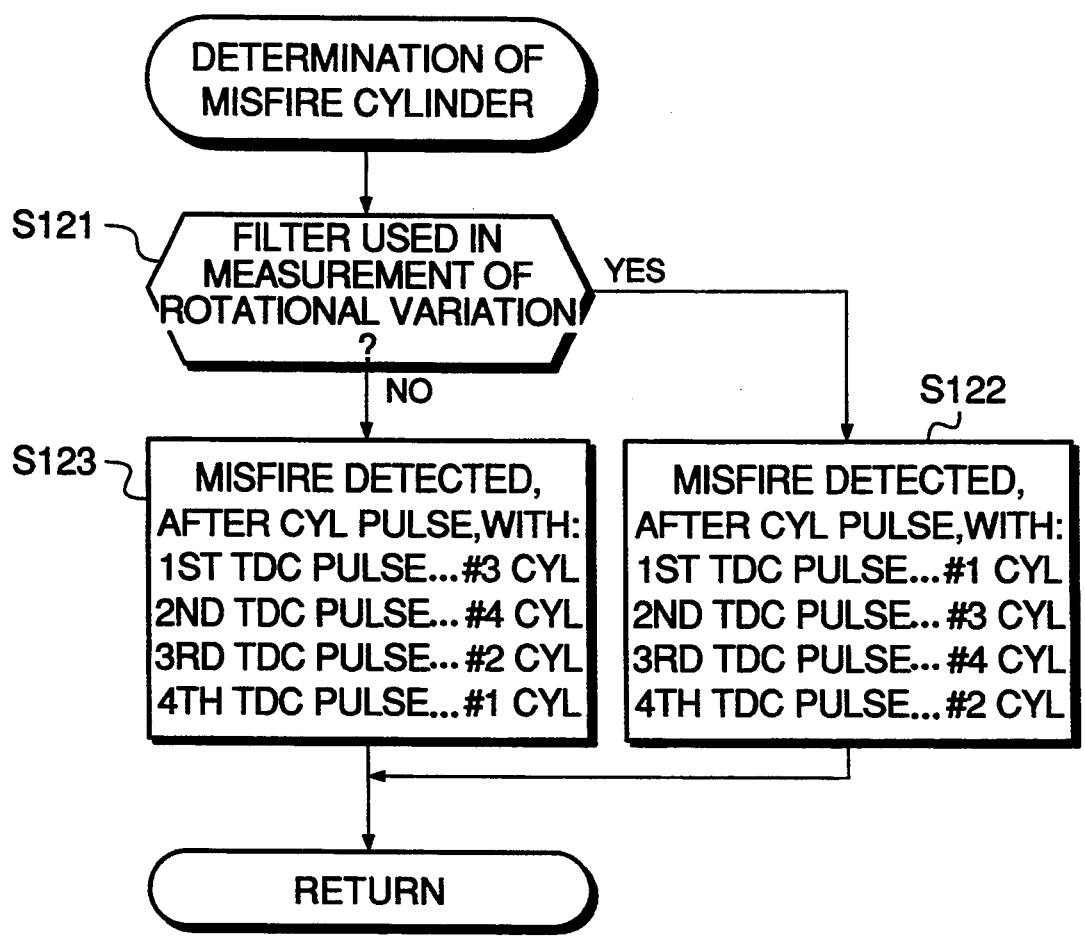
FIG. 24 is a flowchart of a manner of determining a cylinder in which a misfire has occurred.

FIG. 24 shows a routine for determining a cylinder in which a misfire has occurred, which is executed in synchronism with generation of TDC signal pulses.

First, at a step S121, it is determined whether or not either of the filters was used in measuring the variation in the rotational speed of the crankshaft (see FIG. 19).

If the answer to this question is affirmative (YES), since the use of a filter causes a delay of 180° in phase, the misfire-occurring cylinder is determined by taking this delay into account at a step S122, followed by terminating the routine.

More specifically, if a misfire has been detected, upon occurrence of the first TDC signal pulse after occurrence of a CYL signal pulse, it is determined that the misfire has occurred in #1 CYL; if it has been detected upon occurrence of the second TDC signal pulse after occurrence of the CYL signal pulse, it is determined that it has occurred in #3 CYL; if it has been detected upon occurrence of the third TDC signal pulse after occurrence of the CYL signal pulse, it is determined that it has occurred in #4 CYL; and if it has been detected upon occurrence of the fourth TDC signal pulse after occurrence of the CYL signal pulse, it is determined that it has occurred in #2 CYL.

On the other hand, if the answer to the question of the step S121 is negative (NO), a misfire-occurring cylinder is determined by taking into account a change (210°) in the rotational angle of the crankshaft in measuring a TREV(n) value alone, at a step S123, followed by terminating the routine.

More specifically, if a misfire has been detected, upon occurrence of the first TDC signal pulse after occurrence of a CYL signal pulse, it is determined that the misfire has occurred in #3 CYL; if it has been detected upon occurrence of the second TDC signal pulse after occurrence of the CYL signal pulse, it is determined that it has occurred in #4 CYL; if it has been detected upon occurrence of the third TDC signal pulse after occurrence of the CYL signal pulse, it is determined that it has occurred in #2 CYL; and if it has been detected upon occurrence of the fourth TDC signal pulse after occurrence of the CYL signal pulse, it is determined that it has occurred in #1 CYL.

(5) Determination of abnormality (the step S8 in FIG. 15)

Figure 25:
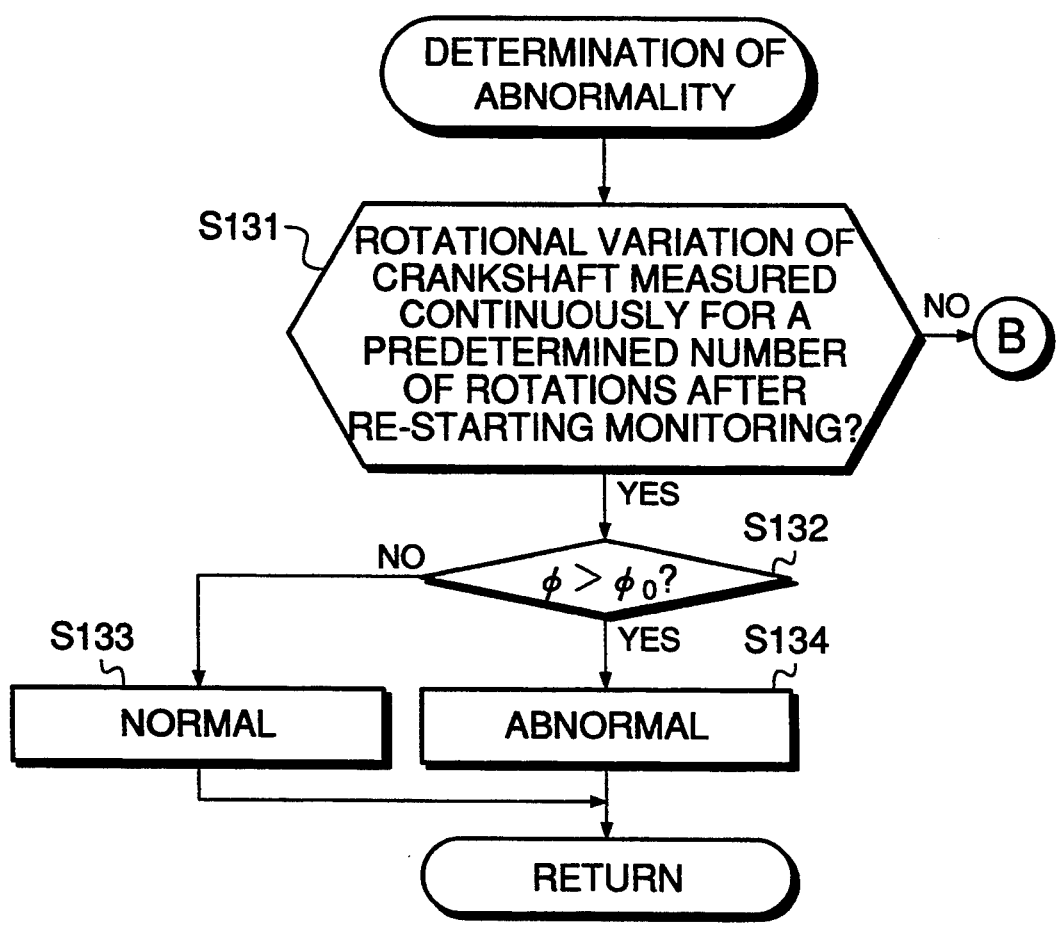
FIG. 25 is a flowchart of a manner of determining abnormality of a cylinder.

FIG. 25 shows a routine for determining abnormality of the engine, which is executed in synchronism with generation of TDC signal pulses.

First, at a step S131, it is determined whether or not variation in the rotational speed of the crankshaft has been measured continuously for a predetermined number (e.g. 1000) of rotations of same. More specifically, it is determined whether or not variation in the rotational speed of the crankshaft has been measured without any change in the operating condition of the engine, such as acceleration or a change in the state of use of the filters, over a predetermined number of rotations of the crankshaft, after the start of monitoring a misfire. If the answer to this question is negative (NO), i.e. if the operating condition of the engine has changed within the predetermined number of rotations of the crankshaft, the misfire-detecting operation is immediately terminated, whereas if the answer is affirmative (YES), the program proceeds to a step S132, where it is determined whether or not the misfire occurrence ratio $\phi$ is larger than a predetermined value $\phi_O$ (e.g. 0.01). The misfire occurrence ratio $\phi$ is calculated by counting a number of misfires, i.e. a number of TDC signal pulses upon which misfires were detected, every predetermined number of rotations of the crankshaft mentioned above. For example, if the predetermined number is 1000, the number of TDC signal pulses generated in a four cylinder type engine corresponding to the predetermined number is 2000. Assuming that the predetermined value $\phi_O$ is equal to 0.01, determination as to whether the ratio $\phi$ is larger than the predetermined value $\phi_O$ is effected by determining whether the number of TDC signal pulses upon which misfires were detected is larger than 20.

If the answer to the question of the step S132 is negative (NO), it is determined at a step S133 that the engine is normally operating, followed by terminating the program, while if the answer is affirmative (YES), it is determined that the engine is abnormal at a step S134, followed by terminating the program.

Figure 26:
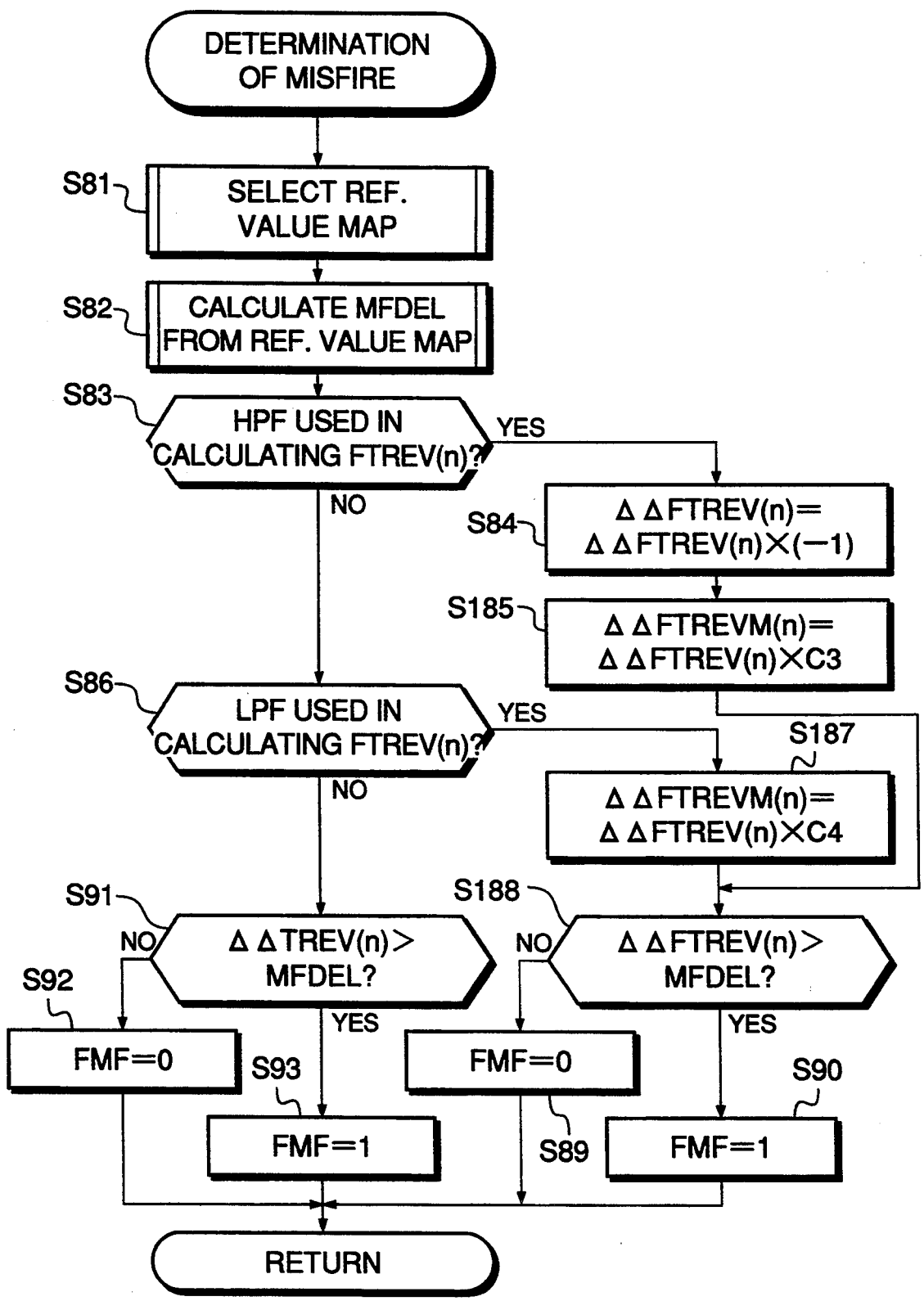
FIG. 26 is a flowchart of a variation of the manner of determining a misfire.

The invention is not limited to the above described embodiments. For example, although in the fifth embodiment, determination of a misfire in the engine is effected by the use of the corrected reference value obtained by correcting the misfire-determining reference value during use of one of the filters (see the steps S85 and S86 in FIG. 20), the rotational variation amount calculated during use of one of the filters may be corrected, instead. More specifically, as shown in FIG. 26, at steps S185 and S187 in the figure, the rotational variation amount during use of one of the filters is multiplied by a correction coefficient, i.e. by a third correction coefficient C3 (e.g. 2.0) when the high-pass filter is used, and by a fourth correction coefficient C4 (e.g. 1.6) when the low-pass filter is used, to obtain a corrected rotational variation amount $\Delta\Delta FTREVM(n)$, and then at a step S188, it is determined whether or not the corrected rotational variation amount $\Delta\Delta FTREVM(n)$ is larger than the misfire-determining reference value MFDEL. This modification can provide the same results.

Further, although in the fifth embodiment, the filter means is comprised of a high-pass filter and a low-pass filter, the filter means may be formed of band-pass filters, and the variation in the rotational speed of the crankshaft may be calculated by selecting the band-pass filters in response to the engine rotational speed detected.

What is claimed is:

1. A misfire-detecting system for an internal combustion engine having a plurality of cylinders, comprising:
    engine rotational speed-detecting means for detecting a rotational speed of said engine and for outputting a waveform signal indicative of the detected rotational speed of said engine;
    signal-processing means for filtering said waveform signal to take out a waveform component having a particular frequency range therefrom;
    differentiating means for differentiating said waveform component output from said signal-processing means; and
    misfire-detecting means for determining occurrence of a misfire in said engine by comparing an output from said differentiating means with a predetermined reference value.

2. A misfire-detecting system according to claim 1, wherein said signal-processing means includes characteristic-changing means for changing a filtering characteristic of said signal-processing means according to said rotational speed of said engine.

3. A misfire-detecting system according to claim 1, wherein said misfire-determining means includes misfire cylinder-determining means for determining a cylinder in which a misfire has occurred, based upon a time lag due to a filtering characteristic of said signal-processing means.

4. A misfire-detecting system for an internal combustion engine having a plurality of cylinders, comprising:
    engine rotational speed-detecting means for detecting a rotational speed of said engine and for outputting a rotational speed signal indicative of the detected rotational speed of said engine;
    signal-processing means for filtering said rotational speed signal to take out a particular frequency component therefrom;
    differentiating means for differentiating an output from said signal-processing means; and
    misfire-detecting means for determining occurrence of a misfire in said engine by comparing an output from said differentiating means with a predetermined reference value, wherein said signal-processing means comprises at least one of a low-pass filter for allowing components of said rotational speed signal lower than a first setting frequency thereof to pass therethrough and a high-pass filter for allowing components of said rotational speed signal higher than a second setting frequency thereof to pass therethrough.

5. A misfire-detecting system for an internal combustion engine having a plurality of cylinders, comprising:
    engine rotational speed-detecting means for detecting a rotational speed of said engine and outputting a rotational speed signal indicative of the detected rotational speed of said engine;
    first signal-processing means for taking out a first particular frequency component from said rotational speed signal and outputting a first signal;
    second signal-processing means for taking out a second particular frequency component from said rotational speed signal and outputting a second signal having a predetermined amount of difference in phase from said first signal;
    third signal-processing means for combining said first signal and said second signal to output a third signal; and
    misfire-determining means for determining occurrence of a misfire in said engine by comparing a value of said third signal from said third signal-processing means with a predetermined reference value.

6. A misfire-detecting system according to claim 5, wherein said first signal-processing means and said second means comprise low-pass filters for taking said first and second particular frequency components lower than respective first and second predetermined frequencies.

7. A misfire-detecting system according to claim 5, wherein said engine has a transmission connected thereto, and said misfire-detecting system includes gear ratio-detecting means for detecting a gear ratio of said transmission, and frequency characteristic-changing means for changing a frequency characteristic of said second signal-processing means in response to an output from said gear ratio-detecting means.

8. A misfire-detecting system for an internal combustion engine having a plurality of cylinders, comprising:

engine rotational speed-detecting means for detecting a rotational speed of said engine and outputting a rotational speed signal indicative of the detected rotational speed of said engine;

first signal-processing means for taking out a particular frequency component from said rotational speed signal and outputting a first signal;

second signal-processing means for taking out a particular frequency component from said rotational speed signal and outputting a second signal;

phase-adjusting means for adjusting a phase of said second signal;

amplifying means for amplifying an output from said phase-adjusting means;

third signal-processing means for combining said first signal and an output from said amplifying means to output a third signal; and misfire-determining means for determining occurrence of a misfire in said engine by comparing a value of said third signal from said third signal-processing means with a predetermined reference value.

9. A misfire-detecting system according to claim 8, including gain control means for changing a gain of said amplifier according to operating conditions of said engine.

10. A misfire-detecting system according to claim 5 or 8, wherein said misfire-determining means includes misfire cylinder-determining means for determining a cylinder in which a misfire has occurred, based upon a time lag due to filtering characteristics of said first and second signal-processing means.

11. A misfire-detecting system for an internal combustion engine having a plurality of cylinders and a crankshaft, comprising:

engine rotational speed-detecting means for detecting a rotational speed of said engine whenever said crankshaft rotates through a predetermined angle and for outputting a waveform signal indicative of the detected rotation speed of said engine;

filter means for taking out a waveform component having a particular frequency range from said waveform signal and for outputting a signal;

differentiating means for differentiating said waveform component output from said filter means and for outputting an output; and misfire-determining means for determining occurrence of a misfire in said engine by comparing an output from said differentiating means with a predetermined reference value.

12. A misfire-detecting system according to claim 11, wherein said filter means comprises a low-pass filter for allowing components of said rotational speed signal lower than a first setting frequency thereof to pass therethrough and a high-pass filter for allowing components of said rotational speed signal higher than a second setting frequency thereof to pass therethrough.

13. A misfire-detecting system for an internal combustion engine having a plurality of cylinders and a crankshaft, comprising:

engine rotational speed-detecting means for detecting a rotational speed of said engine whenever said crankshaft rotates through a predetermined angle and for outputting a rotational speed signal indicative of the detected rotational speed of said engine;

filter means for taking out a predetermined frequency component from said rotational speed signal and for outputting a signal, wherein said filter means comprises a low-pass filter for allowing components of said rotational speed signal lower than a first setting frequency thereof to pass therethrough and a high-pass filter for allowing components of said rotational speed signal higher than a second setting frequency thereof to pass therethrough;

differentiating means for differentiating an output from said filter means and for outputting an output;

difference-calculating means for calculating a difference between a present value of said output from said differentiating means and an average value of immediately preceding values thereof;

misfire-determining means for determining occurrence of a misfire in said engine by comparing an output from said difference-calculating means with a predetermined reference value.

14. A misfire-detecting system according to claim 13, wherein said misfire-determining means determines that a misfire has occurred in said engine when said difference is larger than said predetermined reference value.

15. A misfire-detecting system according to claim 11 or 13, wherein said misfire-determining means includes setting means for setting said predetermined reference value according to operating conditions of said engine.

16. A misfire-detecting system according to claim 11 to 13, wherein said misfire-determining means includes setting means for setting said predetermined reference value depending on a state of engagement between said engine and a driving system of a vehicle on which said engine is installed.

17. A misfire-detecting system according to claim 11 or 13, wherein said misfire-determining means includes setting means for setting said predetermined reference value depending on whether a vehicle on which said engine is installed is a manual transmission type or an automatic transmission type.

18. A misfire-detecting system according to claim 11 or 13, wherein said misfire-determining means includes setting means for setting said predetermined reference value according to a filtering characteristic of said filter means.

19. A misfire-detecting system according to claim 11 or 13, wherein said filter means comprises a low-pass filter for allowing components of said rotational speed signal lower than a first setting frequency thereof to pass therethrough and a high-pass filter for allowing components of said rotational speed signal higher than a second setting frequency thereof to pass therethrough, said misfire-detecting system including changeover means for selecting for use between said high-pass filter and said low-pass filter according to said rotational speed of said engine.

20. A misfire-detecting system according to claim 11 or 13, including correcting means for correcting said output from said differentiating means according to a filtering characteristic of said filter means.

21. A misfire-detecting system according to claim 11 or 13, wherein said misfire-determining means includes misfire cylinder-determining means for determining a cylinder in which a misfire has occurred, based upon a time lag due to a filtering characteristic of said filter means.

22. A misfire-detecting system for an internal combustion engine having a plurality of cylinders and a crankshaft, comprising:

engine rotational speed-detecting means for detecting a rotational speed of said engine whenever said crankshaft rotates through a predetermined angle and outputting a rotational speed signal indicative of the detected rotational speed of said engine;

filter means for taking out a predetermined frequency component from said rotational speed signal and outputting a signal;

correcting means for correcting the output from said filter means according to a filtering characteristic of said filter means; and misfire-determining means for determining occurrence of a misfire in said engine by comparing a value of said signal from said filter means with a predetermined reference value.

23. A misfire-detecting system for an internal combustion engine having a plurality of cylinders and a crankshaft, comprising:

engine rotational speed-detecting means for detecting a rotational speed of said engine whenever said crankshaft rotates through a predetermined angle and outputting a rotational speed signal indicative of the detected rotational speed of said engine;

filter means for taking out a predetermined frequency component from said rotational speed signal and outputting a signal; and misfire-determining means for determining occurrence of a misfire in said engine by comparing a value of said signal from said filter means with a predetermined reference value, wherein said misfire-determining means includes setting means for setting said predetermined reference value depending on a state of engagement between said engine and a driving system of a vehicle on which said engine is installed.

24. A misfire-detecting system for an internal combustion engine having a plurality of cylinders and a crankshaft, comprising:

engine rotational speed-detecting means for detecting a rotational speed of said engine whenever said crankshaft rotates through a predetermined angle and outputting a rotational speed signal indicative of the detected rotational speed of said engine;

filter means for taking out a predetermined frequency component from said rotational speed signal and outputting a signal; and misfire-determining means for determining occurrence of a misfire in said engine by comparing a value of said signal from said filter means with a predetermined reference value, wherein said misfire-determining means includes setting means for setting said predetermined reference value depending on whether a vehicle on which said engine is installed is a manual transmission type or an automatic transmission type.

25. A misfire-detecting system for an internal combustion engine having a plurality of cylinders and a crankshaft, comprising:

engine rotational speed-detecting means for detecting a rotational speed of said engine whenever said crankshaft rotates through a predetermined angle and outputting a rotational speed signal indicative of the detected rotational speed of said engine;

filter means for taking out a predetermined frequency component from said rotational speed signal and outputting a signal; and misfire-determining means for determining occurrence of a misfire in said engine by comparing a value of said signal from said filter means with a predetermined reference value, wherein said misfire-determining means includes setting means for setting said predetermined reference value according to a filtering characteristic of said filter means.

26. A misfire-detecting system for an internal combustion engine having a plurality of cylinders and a crankshaft, comprising:

engine rotational speed-detecting means for detecting a rotational speed of said engine whenever said crankshaft rotates through a predetermined angle and outputting a rotational speed signal indicative of the detected rotational speed of said engine;

filter means for taking out a predetermined frequency component from said rotational speed signal and outputting a signal, said filter means includes a low-pass filter for allowing components of said rotational speed signal lower than a first setting frequency thereof to pass therethrough and a high-pass filter for allowing components of said rotational speed signal higher than a second setting frequency thereof to pass therethrough; and misfire-determining means for determining occurrence of a misfire in said engine by comparing a value of said signal from said filter means with a predetermined reference value.

27. A misfire-detecting system for an internal combustion engine having a plurality of cylinders and a crankshaft, comprising:

engine rotational speed-detecting means for detecting a rotational speed of said engine whenever said crankshaft rotates through a predetermined angle and outputting a rotational speed signal indicative of the detected rotational speed of said engine;

filter means for taking out a predetermined frequency component from said rotational speed signal and outputting a signal, said filter means includes a low-pass filter for allowing components of said rotational speed signal lower than a first setting frequency thereof to pass therethrough and a high-pass filter for allowing components of said rotational speed signal higher than a second setting frequency thereof to pass therethrough; and misfire-determining means for determining occurrence of a misfire in said engine by comparing a value of said signal from said filter means with a predetermined reference value, said misfire-detecting system including changeover means for selecting for use between said high-pass filter and said low-pass filter according to said rotational speed of said engine.

28. A misfire-detecting system for an internal combustion engine having a plurality of cylinders and a crankshaft, comprising:

engine rotational speed-detecting means for detecting a rotational speed of said engine whenever said crankshaft rotates through a predetermined angle and outputting a rotational speed signal indicative of the detected rotational speed of said engine;

filter means for taking out a predetermined frequency component from said rotational speed signal and outputting a signal; and misfire-determining means for determining occurrence of a misfire in said engine by comparing a value of said signal from said filter means with a predetermined reference value, wherein said misfire-determining means includes misfire cylinder-determining means for determining a cylinder in which a misfire has occurred, based upon a time lag due to a filtering characteristic of said filter means.

29. A misfire-detecting system for an internal combustion engine having a plurality of cylinders, comprising:

engine rotational speed-detecting means for detecting a rotational speed of said engine and outputting a rotational speed signal indicative of the detected rotational speed of said engine;

signal-processing means for filtering said rotational speed signal to take out a particular frequency component therefrom; and misfire-determining means for determining occurrence of a misfire in said engine by comparing an output from said signal-processing means with a predetermined reference value, wherein said misfire-determining means includes misfire cylinder-determining means for determining a cylinder in which a misfire has occurred, based upon a time lag due to a filtering characteristic of said signal-processing means.

* * * * *